United States Patent [19]
Nomura et al.

[11] Patent Number: 5,654,550
[45] Date of Patent: Aug. 5, 1997

[54] SIGNAL PROCESSOR FOR PYROELECTRIC INFRARED SENSOR

[75] Inventors: Tadashi Nomura; Shigeo Yamazaki, both of Nagaokakyo, Japan

[73] Assignee: Murata Manufacturing Co., Ltd., Japan

[21] Appl. No.: 635,965

[22] PCT Filed: Sep. 28, 1995

[86] PCT No.: PCT/JP95/01968

§ 371 Date: Apr. 22, 1996

§ 102(e) Date: Apr. 22, 1996

[87] PCT Pub. No.: WO96/10162

PCT Pub. Date: Apr. 4, 1996

[30] Foreign Application Priority Data

Sep. 28, 1994 [JP] Japan ................. 6-233203
Aug. 24, 1995 [JP] Japan ................. 7-240663

[51] Int. Cl.$^6$ ............................................. G01J 5/00
[52] U.S. Cl. ............................................. 250/338.3
[58] Field of Search ................................. 250/338.3

[56] References Cited

U.S. PATENT DOCUMENTS

| | | | |
|---|---|---|---|
| 4,263,585 | 4/1981 | Schaefer | 340/567 |
| 4,808,822 | 2/1989 | Manning et al. | 250/332 |
| 4,973,843 | 11/1990 | Murata et al. | 250/338.3 |

FOREIGN PATENT DOCUMENTS

| | | |
|---|---|---|
| 48-79687 | 10/1973 | Japan . |
| 57-39367 | 3/1982 | Japan . |
| 62-165538 | 10/1987 | Japan . |
| 63-217232 | 9/1988 | Japan . |
| 2-148429 | 12/1990 | Japan . |

*Primary Examiner*—Constantine Hannaher
*Attorney, Agent, or Firm*—Ostrolenk, Faber, Gerb & Soffen, LLP

[57] ABSTRACT

A signal processor which is capable of amplifying, at a predetermined amplification factor, only AC components of input signals Vin received from a pyroelectric infrared sensor or sensors. The signal processor essentially includes a low-pass filter circuit (11) for passing on only a DC component of an input signal (Vin) received from a pyroelectric infrared sensor (1), and a differential amplifier circuit (21) arranged to amplify only an AC component of the input signal (Vin) on the basis of a DC signal (VDC) passed through the low-pass filter circuit (11) and the input signal (Vin) received from the pyroelectric infrared sensor (1). Along with the input signal (Vin) from the pyroelectric infrared sensor, the differential amplifier circuit (21) is supplied with the DC signal (VDC) which is a DC component of the input signal (Vin) which has been passed through the low-pass filter circuit. The differential amplifier circuit (21) operates to amplify a differential signal (Vin−VDC), producing at its output terminal an output voltage Vout having only an AC component (VAC) of the input signal amplified at an amplification factor α as determined by settings of resistance values.

15 Claims, 15 Drawing Sheets

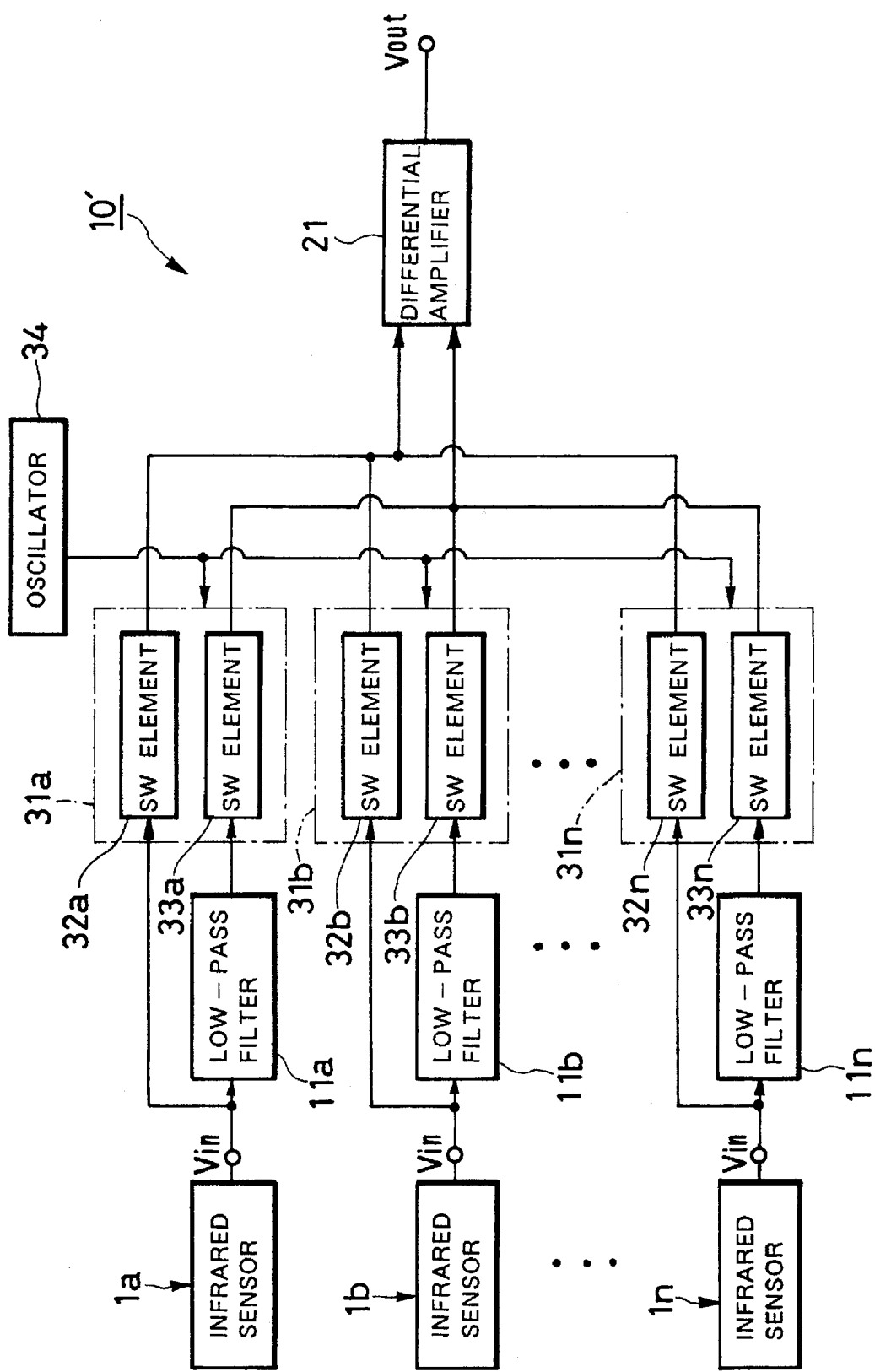

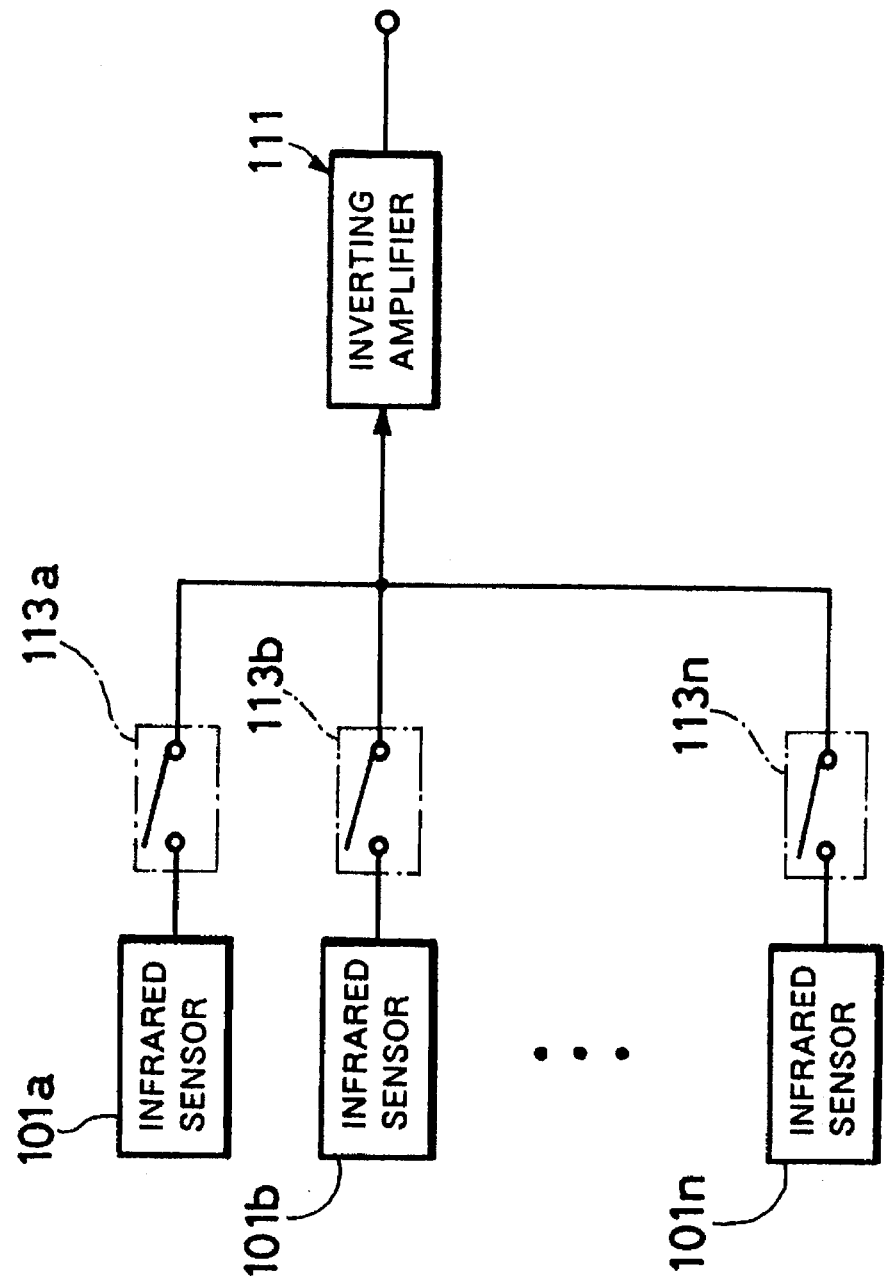

SIGNAL PROCESSOR FOR PYROELECTRIC INFRARED SENSOR

TECHNICAL FIELD

This invention relates to a signal processor for pyroelectric infrared sensor suitable for amplification of output signals of a pyroelectric infrared sensor or sensors.

BACKGROUND ART

Generally, the so-called pyroelectric infrared sensors have been known and in use as infrared sensors for detection of infrared radiations from a heating element. Such pyroelectric infrared sensors employ an infrared detection element of a pyroelectric material such as lead titanate ($PbTiO_3$) or the like which is capable of producing pyroelectric effects. Namely, a pyroelectric element has properties such that, when subjected to a temperature change, for example, when heated by infrared rays incident on its surface, it loses electrical stability and produces charge due to spontaneous polarizations which turn a neutral state of charge into an electrically unbalanced state. Since pyroelectric material has an extremely high impedance, e.g., as high as several hundreds $G\Omega$, the charge produced in an infrared detection element can be picked up as a voltaic output signal by the use of an impedance transformer.

Illustrated by way of example in FIG. 14 are an infrared detection element and an impedance transformer circuit in a prior art infrared sensor.

In this figure, indicated at 101 is a pyroelectric infrared sensor which is constituted by an infrared detection element 102 and an impedance transformer circuit 103. The just-mentioned impedance transformer circuit 103 consists of a field-effect transistor (FET) 104 having its gate terminal connected to the output of the infrared detection element 102, a gate resistor Rg connected between the gate terminal of FET 104 and ground, and a drain resistor Rd connected between the drain terminal of FET 104 and ground. FET 104 is supplied with a source voltage Vcc at its source terminal, delivering at its drain terminal an output signal Vs from the pyroelectric infrared sensor 101.

In this instance, the output signal Vs of the impedance transformer circuit 103 consists of two components (AC and DC components), more specifically, a weak AC signal from the infrared detection element 102 and a DC signal attributable to the nature of FET 104.

Illustrated in FIG. 15 is a prior art signal processor circuitry which, has been conventionally resorted to for amplification of output signal Vs of a pyroelectric infrared sensor.

As seen in this figure, the signal processor is arranged as an inverting amplifier circuit 111 including an OP AMP (operational amplifier) 112, a coupling capacitor Ca and an input resistor ra connected in series between an inverting input terminal of the OP AMP 112 and an input terminal T1 of the inverting amplifier circuit 111, and a negative feedback resistor rb connected between output terminal and inverting input terminal of OP AMP 112. The noninverting input terminal of OP AMP 112 is grounded.

The output signal Vs of the infrared sensor 101 is fed to the input terminal T1 of the inverting amplifier circuit 111 as an input signal Vin, which input signal Vin being fed to the inverting input terminal of OP AMP 112 through a series circuit of the coupling capacitor Ca and input resistor ra for removing DC components therefrom.

OP AMP 112 has its output terminal T2 connected to its inverting input terminal through the negative-feedback resistor rb. The output voltage Vout can be defined as in Expression 1 below where f is the frequency of the input signal Vin.

$$Vout = -\frac{rb}{\sqrt{ra^2 + \left(\frac{1}{2\pi f Ca}\right)^2}} \times Vin \qquad \text{[Expression 1]}$$

As clear from Expression 1 above, the smaller the frequency (f) of the input signal Vin, the smaller become the amplification factor and the output voltage Vout. Therefore, in order to use the inverting amplifier circuit 111 at a predetermined amplification factor, it is necessary for the input frequency (f) to be in a limited bandwidth.

In this regard, irrespective of the frequency (f) of the input signal Vin, it is conceivable to obtain a predetermined amplification factor through the inverting amplifier circuit 111 by increasing the resistance of the input resistor ra to a much greater value as compared with the impedance ($\frac{1}{2\pi Ca}$) ($\Omega$) of the capacitor Ca or by increasing the electrostatic capacitance of the capacitor Ca. For instance, in a case where the electrostatic capacitance of the capacitor Ca is set at 22 ($\mu$F), the amplification rate at 60 (dB) and the low-frequency cut-off level (f) at 0.1 Hz, respectively, it will become necessary to employ an input resistor ra of approximately 70 (k$\Omega$) and a negative-feedback resistor rb of approximately 70 (M$\Omega$).

Moreover, for the purpose of broadening the viewfield of detection, there may arise a necessity for using a pyroelectric infrared sensor which consists of a plural number of similar pyroelectric infrared sensor units $101a$, $101b$, ... $101n$. In such a case, it has been the usual practice to feed input signals Vin from a plural number of pyroelectric infrared sensor units $101a$ to $101n$ sequentially to a common inverting amplifier circuit 111 by way of switches $113a$ to $113n$ for amplification as shown in FIG. 16, because this is desirable from the standpoint of simplification of circuit arrangements and from reducing the number of component parts and the production cost.

However, difficulties are usually encountered in case the negative-feedback resistor rb of the inverting amplifier circuit 111 is required to be of a resistance value as high as 70 M$\Omega$, because resistors of this class are very costly despite irregularities in resistance value which will be reflected by irregularities in characteristics among individual amplifier circuits of ultimate products.

Besides, it becomes necessary to use an electrolytic capacitor for the coupling capacitor Ca which needs to be of a large electrostatic capacitance. However, the use of an electrolytic capacitor involves a problem of large leakage current through the input resistor ra and the negative-feedback resistor rb, inviting a problem of offset voltage which occurs to the output voltage Vout after amplification due to a voltage drop.

Further, in case an electrolytic capacitor of normal standards is used in combination with a negative feedback resistor rb of 70 (M$\Omega$) in resistance value, the output voltage Vout tends to get saturated under the influence of the leakage current, rendering the operation of the inverting amplifier circuit completely infeasible. For these reasons, difficulties have been experienced in amplifying an input signal Vin of low frequency (f) at a high amplification factor.

Furthermore, in a case where a coupling capacitor Ca is connected to the inverting input terminal of OP AMP 112, due to a DC potential difference across the electrodes of the capacitor, the inverting amplifier circuit 111 cannot be put in a normally operative state immediately after turning on a power switch, that is, it cannot be put in a normally operative state until charge is stored in the capacitor Ca up to a level corresponding to the potential difference.

For example, in the case of the inverting amplifier circuit shown in FIG. 15, considering the large electrostatic capacitance and the time constant, the capacitor Ca takes at least 20 seconds to reach a charged state even if arrangements are made to shorten its charging time. Therefore, difficulties have also been experienced in amplifying output signals Vs of a plural number of pyroelectric infrared sensors 101a to 101n by sequentially connecting the respective infrared sensors 101a to 101n operatively to a single common inverting amplifier circuit 111 by a high speed switching operation.

It is an object of the present invention to provide a signal processor for a pyroelectric infrared sensor or sensors, which signal processor being capable of amplifying a low-frequency output signal of a pyroelectric infrared sensor at a constant amplification factor, without resorting to a resistor of a high resistance value or a coupling capacitor.

DISCLOSURE OF INVENTION

In accordance with the present invention, the above-stated objective is achieved by the provision of a signal processor for pyroelectric infrared sensor, the signal processor essentially including a low-pass filter circuit for passing on only a DC component of an input signal received from a pyroelectric infrared sensor, and a differential amplifier circuit arranged to amplify and output only an AC component of the input signal from the pyroelectric infrared sensor on the basis of a DC component signal passed through the low-pass filter circuit and the corresponding input signal from the pyroelectric infrared sensor.

In the case of the signal processor of the arrangements just described, the low-pass filter circuit operates to pass on only a DC component of an input signal received from a pyroelectric infrared sensor, while the differential amplifier circuit operates to amplify and output only an AC component of the input signal on the basis of a DC signal passed through the low-pass filter circuit and the corresponding input signal received from the pyroelectric infrared sensor. Consequently, at the output terminal of the differential amplifier circuit, one can pick up an output signal which contains, at an amplified level, only an AC component of an input signal received from a pyroelectric infrared sensor.

In accordance with the present invention, there is also provided a signal processor for a pyroelectric infrared sensor, the signal processor essentially including a low-pass filter circuit for passing on only a DC component of an input signal received from a pyroelectric infrared sensor, a differential amplifier circuit to amplify and output only an AC component of the input signal on the basis of a DC signal passed through the low-pass filter circuit and the corresponding input signal from the pyroelectric infrared sensor, and a DC biasing means connected in a stage immediately succeeding the differential amplifier circuit and adapted to apply a DC bias to the amplified AC signal output from the differential amplifier circuit.

In the case of the signal processor of the arrangements just described, the low-pass filter circuit passes a DC signal which corresponds only to a DC component of an input signal received from a pyroelectric infrared sensor. Then, the differential amplifier circuit produces at its output terminal an amplified AC signal, which corresponds only to an AC component of the received input signal, on the basis of the DC signal passed through the low-pass filter and the corresponding input signal from the infrared sensor. Namely, produced at the output terminal of the differential amplifier circuit is an amplified AC signal which corresponds only to the AC component of the input signal which has been received from the pyroelectric infrared sensor. Further, a DC bias is applied to the AC output signal from the differential amplifier circuit by the DC biasing means in an immediately succeeding stage. Thus, from the DC biasing means, one can obtain an output signal which has a DC bias added to the amplified AC signal.

In accordance with the present invention, there is also provided a signal processor for pyroelectric infrared sensors, the signal processor essentially including a plural number of low-pass filter circuits each arranged to pass on only a DC component of an input signal received from a corresponding one of a plural number of pyroelectric infrared sensors, and a single differential amplifier circuit arranged to sequentially amplify and output only AC components of the input signals from the respective pyroelectric infrared sensors, on the basis of DC signals passed through the respective low-pass filter circuits and corresponding input signals from the pyroelectric infrared sensors.

In the case of the signal processor of the arrangements just described, a plural number of low-pass filter circuits operate to output DC components of input signals received from corresponding pyroelectric infrared sensors, while a single differential amplifier circuit operates to sequentially amplify and output only AC components of the input signals received from the respective pyroelectric infrared sensors, on the basis of the DC signals from the low-pass filter circuits and the input signals from the corresponding infrared sensors. Consequently, at the output terminal of the differential amplifier circuit, one can pick up output signals of amplified AC components of input signals which are sequentially received from the respective pyroelectric infrared sensors.

Further, in accordance with the invention, there is provided a signal processor for pyroelectric infrared sensors, which signal processor essentially including a plural number of low-pass filter circuits arranged to pass on only DC components of input signals received from a plural number of pyroelectric infrared sensors, a single differential amplifier circuit arranged to sequentially amplify and output AC components of input signals received from the respective pyroelectric infrared sensors, on the basis of DC signals passed through the low-pass filter circuits and corresponding input signals from the infrared sensors, and a DC biasing means connected in a stage immediately succeeding the differential amplifier circuit to add a DC bias to the respective amplified AC signals output from the differential amplifier circuit.

In the case of the signal processor of the arrangements just described, a plural number of low-pass filter circuits operate to pass on DC components of input signals received from the respective pyroelectric infrared sensors, while a single differential amplifier circuit operates to sequentially amplify and output only AC components of the input signals received from the respective pyroelectric infrared sensors, on the basis of the DC signals from the low-pass filter circuits and the input signals received form the corresponding infrared sensors. In addition, the DC biasing means operates to add a DC bias to each of the amplified AC signals output from the differential amplifier circuit. Consequently, at the output terminal of the DC biasing means, one can pick up signals each having a DC bias added to an amplified AC signal corresponding to an AC component of the input signal.

In each of the above-described various forms of the signal processor according to the present invention, a connection switching means is provided between a pyroelectric infrared sensor and a different amplifier circuit, and between a low-pass filter circuit and the differential amplifier circuit.

By operating these connection switching means, a pyroelectric infrared sensor and a corresponding low-pass filter circuit or circuits can be sequentially connected to and disconnected from the differential amplifier circuit in a synchronized fashion. Accordingly, in case of controlling connections of a plural number of pyroelectric infrared sensors and a plural number of low-pass filter circuits relative to a single common differential amplifier circuit, the switching means are operated to connect the respective pairs of a pyroelectric infrared sensor and a low-pass filter circuit sequentially to the differential amplifier circuit.

Moreover, according to the present invention, the above-described DC biasing means is constituted by an inverting amplifier circuit in the form of an OP AMP, and a reference voltage circuit which is arranged to apply a reference voltage as a bias, the inverting amplifier circuit having an inverting input terminal thereof connected to an output terminal of the above-described differential amplifier circuit and a noninverting input terminal connected to output terminals of the reference voltage circuit and low-pass filter circuit.

In the case of the signal processor of the arrangements just described, the inverting amplifier circuit receives at its inverting input terminal an AC signal corresponding to an AC component of an input signal received from a pyroelectric infrared sensor through the differential amplifier circuit. Further, at the noninverting input terminal, the inverting amplifier circuit receives a DC signal corresponding to a DC component in the input signal received from the pyroelectric infrared sensor through the low-pass filter circuit. Consequently, the inverting amplifier circuit produces at its output terminal a signal which contains, in addition to an amplified AC signal, a DC reference voltage which is applied from the reference voltage circuit.

In the above-described various forms of the invention, the low-pass filter circuit may be constituted by a resistor and a capacitor which are connected in series between the output terminal of a pyroelectric infrared sensor and ground in such a way as to pass on only a DC component of an input signal while cutting off AC components (of high frequencies).

In this instance, preferably a switching element is connected across the opposite ends of the resistor of the low-pass filter circuit. By so doing, on starting the low-pass filter circuit, the switching element is closed to supply a relatively large current (input signal) from the infrared sensor to the capacitor, through a shortcircuit path around the resistor, thereby permitting to shorten the charging time of the capacitor. Thus, the provision of the switching element contributes to cut the lengthy warm-up time which would otherwise be required for putting the low-pass filter circuit in an operative condition.

Alternatively, the low-pass filter circuit according to the present invention may be constituted by an OP AMP, a resistor connected between output terminal and inverting input terminal of the OP AMP and a capacitor connected parallel with the resistor, the noninverting input terminal of OP AMP being connected to the output terminal of an infrared sensor, thereby outputting only a DC component of an input signal from the infrared sensor while cutting off AC components (of high frequencies).

Furthermore, in accordance with the present invention, the above-described differential amplifier circuit may be constituted by an OP AMP having its inverting input terminal connected to the output terminal of a pyroelectric infrared sensor and having its noninverting input terminal connected to the output terminal of a low-pass filter circuit.

In the case of the signal processor of the arrangements just described, the differential amplifier circuit functions as an inverting amplifier circuit, amplifying only an AC component of an input signal from a pyroelectric infrared sensor and producing at its output terminal a signal which contains a DC signal along with an amplified AC signal.

Alternatively, the differential amplifier circuit in the signal processor according to the present invention may be constituted by an OP AMP, and a series resistor circuit connected between the output terminal of the above-described low-pass filter circuit and ground, the OP AMP having its noninverting input terminal connected to a voltage dividing point of the series resistor circuit and having its inverting input terminal connected to the output terminal of an infrared sensor.

In the case of the signal processor of the arrangements just described, the differential amplifier circuit is arranged to operate as an inverting amplifier circuit, amplifying only an AC component of an input signal received from a pyroelectric infrared sensor and producing at its output terminal a signal which contains only an amplified AC component, getting rid of a DC component of the input signal.

Furthermore, the signal processor according to the present invention may include a buffer circuit connected between the above-described low-pass filter circuit and the differential amplifier circuit, a buffer circuit connected between the pyroelectric infrared sensor and the differential amplifier circuit, and/or a buffer circuit connected between the low-pass filter circuit and the DC biasing means, for the purpose of preventing electrical interferences between the respective circuits.

BRIEF DESCRIPTION OF DRAWINGS

In the accompanying drawings:

FIG. 3 is a block diagram of a second embodiment of the pyroelectric infrared sensor signal processor according to the present invention;

FIG. 16 is a block diagram of another conventional pyroelectric infrared sensor signal processing device.

BEST MODE FOR CARRYING OUT THE INVENTION

Figure 1:
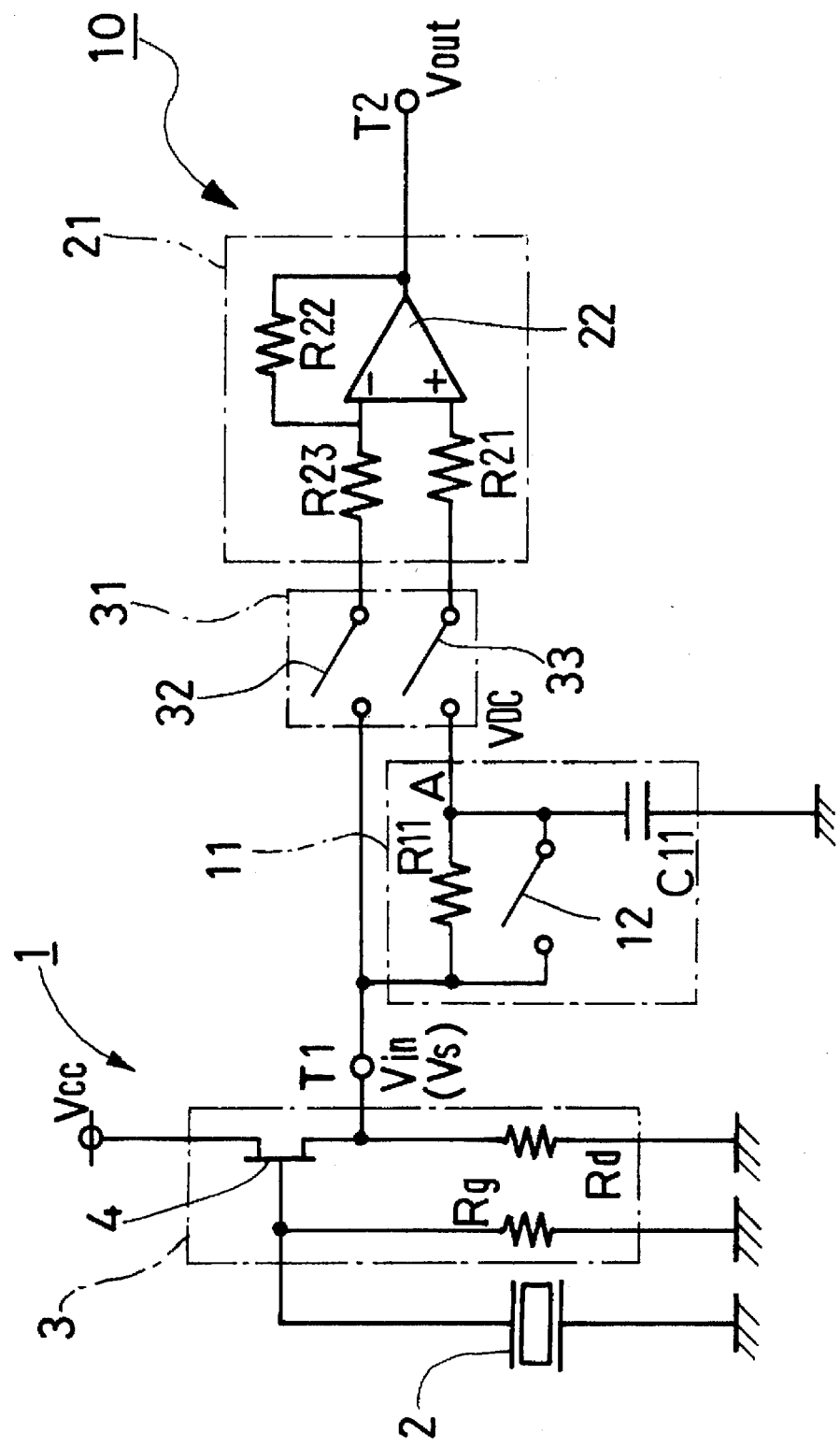
FIG. 1 is a circuit diagram of a first embodiment of the pyroelectric infrared sensor signal processor according to the present invention.

The present invention is now described more particularly by way of its preferred embodiments shown in FIGS. 1 through 13. In the following description of preferred embodiments, those component parts which are common with the above-described prior art counterparts are simply designated by common reference numerals or characters without repeating similar explanations.

Figure 2A:
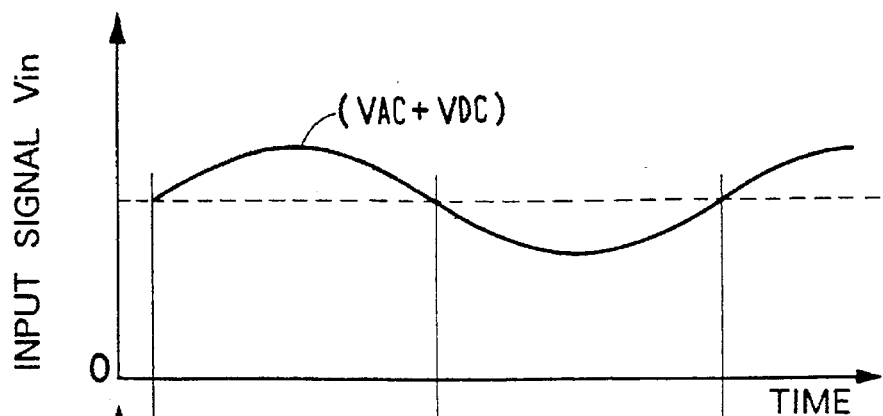
FIG. 2 shows waveform diagrams of an input signal received from a pyroelectric infrared sensor as in FIG. 1, a DC signal passed through a low-pass filter circuit, and an output signal of a differential amplifier circuit.
Figure 2D:
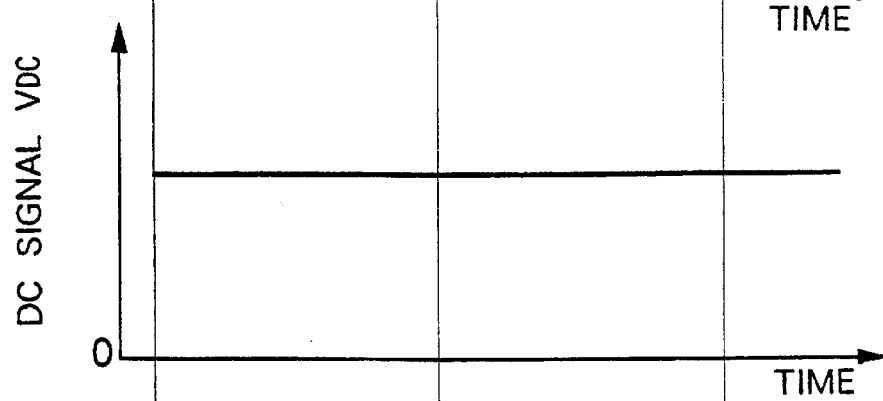
Figure 2C:
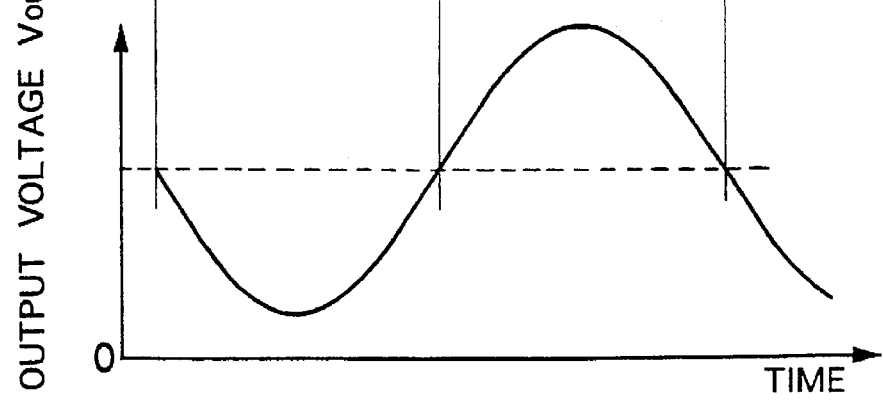

Referring first to FIGS. 1 and 2, there is shown a first embodiment of the present invention, which is a single sensor type signal processor.

In these figures, indicated at 1 is a pyroelectric infrared sensor which is largely constituted, similarly to the prior art infrared sensor 101 described hereinbefore, by an infrared detection element 2 and an impedance transformer circuit 3 employing an field-effect transistor 4. Gate resistor Rg and drain resistor Rd are connected to the gate and drain terminals of the field-effect transistor 4, respectively. Produced at the drain terminal is an output voltage Vs commensurate with the level of incident infrared rays on the infrared detection element 2. This output signal Vs consists of a weak AC component from the infrared detection element 2 and a DC component inherent to the field-effect transistor 4.

Indicated at 10 is a pyroelectric infrared sensor signal processor of this embodiment, which is connected in a stage succeeding the pyroelectric infrared sensor 1 and largely constituted by a low-pass filter circuit 11, a differential amplifier circuit 21 and a switch 31 as will be described hereinafter.

The low-pass filter circuit 11 of this embodiment consists of a resistor R11 and a capacitor C11 which are connected in series. Namely, the low-pass filter circuit 11 is arranged as an L-type low-pass filter circuit which is grounded at one end on the side of the capacitor C11 and connected to an input terminal T1 of the signal processor 10 at the other end on the side of the resistor R11. This low-pass filter circuit 11 functions to cut off an AC component VAC of the input signal Vin which is supplied from the pyroelectric infrared sensor 1 to the input terminal T1 through the switch 31, passing only a DC component VDC of the input signal on to a differential amplifier circuit 21. The output signal Vs of the pyroelectric infrared sensor, that is to say, the input signal Vin which is received at the amplifier input terminal T1, consists of an AC signal VAC and a DC signal VDC as indicated at (a) of FIG. 2, and can be expressed as Vin= VAC+VDC.

Indicated at 12 is a switching element which is connected parallel with and across the opposite ends of the resistor R11, and functions to shortcircuit the resistor R11 when it is closed.

The differential amplifier circuit 12 is constituted by an OP AMP 22, input resistor R21, negative feedback resistor R22 and another resistor R23. The input resistor R21 is connected between a noninverting input terminal of OP AMP 22 and a voltage dividing point A which is in turn located between the resistor R11 and capacitor C11 of the low-pass filter circuit 11. The negative feedback resistor R22 is connected between output and inverting input terminals of the OP AMP 22. The other input resistor R23 is connected between the inverting input terminal of OP AMP 22 and the afore-mentioned input terminal T1 of the signal processor.

Through the input terminal T1 and switch 31, the inverting input terminal of OP AMP 22 receives the input signal Vin from the pyroelectric infrared sensor 1, which contains an AC signal VAC and a DC signal VDC as mentioned above, while the noninverting input terminal of OP AMP 22 receives only a DC signal component VDC from the low-pass filter circuit 11. Accordingly, the differential amplifier circuit 21 functions to amplify only the AC component VAC of the input signal Vin.

The switch 31 is constituted by a first switching element 32 and a second switching element 33. The first switching element 32 is connected between the infrared sensor 1 and the differential amplifier circuit 21, while the second switching element is connected between the low-pass filter circuit 11 and the differential amplifier circuit 21. These switching elements 32 and 33 are operated to open and close simultaneously in an interlinked fashion.

The above-described pyroelectric infrared sensor signal processor 10 operates in the manner as described below.

Firstly, upon turning on a power switch for the pyroelectric infrared sensor signal processor 10, a circuit (not shown) which operates the switching element 12 is actuated to shortcircuit the opposite ends of the resistor R11. As a consequence, a charge corresponding to the DC component VDC of the input signal Vin is quickly stored in the capacitor C11. Then, upon lapse of a predetermined time period, the switching element 12 is turned off to put the low-pass filter circuit 11 immediately in a normally operative state.

Of the components of the input signal Vin, the signal component which is lower than the cut-off frequency of the low-pass filter circuit 11 is considered as a DC component. Accordingly, the low-pass filter circuit 11 passes through to its output terminal a DC signal VDC as shown at (b) of FIG. 2. For example, in order to get a frequency component lower than 0.1 Hz from the low-pass filter circuit 11, resistance value of the resistor R11 and the electrostatic capacitance of the capacitor C11 suffice to be as small as approximately 2 (MΩ) and 1 (µF), respectively. This is advantageous not only because the circuit components of this class are available at low cost but also because it becomes possible to employ for the capacitor 11 a ceramic capacitor or a film capacitor with less current leakage. Besides, the DC signal VDC can be input to the noninverting terminal of OP AMP 22 of the differential amplifier circuit 21 by using an input resistor R21 of a resistance value which is sufficiently lower than the input impedance of OP AMP 22. Accordingly, a differential signal between the input signal Vin and the DC signal VDC which is a DC component of the input signal Vin, namely, an AC component VAC alone of the input signal Vin can be amplified at an amplification factor α which is determined by the ratio of resistance values of R22 and R23 (R22/R13).

Consequently, as shown at (c) of FIG. 2, the output voltage Vout of the differential amplifier circuit 21 can be defined as:

$$\text{Vout} = -\alpha \times VAC + VDC \quad \text{[Expression 2]}$$
$$= -\frac{R22}{R23} \times (Vin - VDC) + VDC$$

In this manner, the output voltage Vout of the differential amplifier circuit 21 consists of an amplified AC signal, resulting from amplification of only the AC component VAC of the input signal Vin as indicated by the first term of Equation 2, plus an added DC bias as indicated by the second term of the equation.

Namely, with the signal processor 10 of this embodiment, the input signal Vin which is received at the processor input terminal T1 is fed to the low-pass filter circuit 11 and the different amplifier circuit 21. From the low-pass filter circuit 11, only the DC component VDC of the input signal Vin is passed on to the differential amplifier circuit 21, at which only the AC component VAC of the input signal Vin is amplified at the amplification factor α (R22/R23) to deliver to its output terminal an output voltage Vout which has a DC signal VDC added as a DC bias to the amplified AC signal VAC.

Accordingly, the signal processor 10 of this embodiment, which is constituted simply by the low-pass filter circuit 11 and the differential amplifier circuit 21, can produce an output voltage Vout selectively amplifying only the AC component VAC out of the two signal components VAC and VDC of the input signal Vin, without using a coupling capacitor as in the prior art counterpart. In addition, the absence of a coupling capacitor Ca makes it possible to amplify even low-frequency components of the input signal Vin accurately at the amplification factor α (R22/R23). Further, the absence of a coupling capacitor permits use of a negative feedback resistor of a small impedance, contributing to reduce irregularities in impedance between individual signal processors for ensuring accurate signal amplifications at a predetermined factor.

Consequently, despite the addition of the DC signal VDC, it is the AC signal VAC alone that is amplified through the signal processor, and fluctuations in the DC bias can be precluded, thereby permitting to detect variations in the value of α×VAC, that is, variations in peak values of AC signals corresponding to the calorific values perceived by the pyroelectric infrared sensor 1.

Besides, since the switching element 12 is connected across the opposite ends of the resistor R11 of the low-pass filter circuit 11, the DC signal VDC to be stored in the capacitor C11 can be quickly supplied to the latter around the resistor R11 by closing the switching element 12 for a predetermined short time period, putting the low-pass filter circuit 11 immediately in an operative state upon switching on the operation of the signal processor 10.

The switching element 12 can be dispensed with in a case where there would arise no necessity for establishing an operating state immediately after turning on a power switch for the pyroelectric infrared sensor signal processor 10.

Further, in the above-described embodiment, the switch 31 is provided to connect a preceding stage of the signal processor, including the infrared sensor 1 and the low-pass filter circuit 11, to a succeeding stage which is constituted by the differential amplifier circuit 21, so that it can be omitted in case the preceding stage involves only one and single infrared sensor.

Referring now to FIG. 3, there is shown a signal processor 10' as a second embodiment of the invention, which is arranged to amplify input signals from a plural number of pyroelectric infrared sensors, employing a plural number of low-pass filter circuits which are connected at their input ends to the respective infrared sensors and at their output ends to a single differential amplifier circuit through a plural number of switching elements.

In the following description of the second embodiment, those components parts which have an identical or corresponding counterpart in the above-described prior art counterpart or in the foregoing first embodiment are simply designated by a corresponding reference numeral or character without repeating detailed explanations. For instance, a plural number of pyroelectric infrared sensors in this embodiment are simply designated by references $1a$, $1b$ ... $1n$, and a plural number of low-pass filter circuits for the respective sensors are also simply designated by references $11a$, $11b$ ... $11c$ without repeating descriptions on these component parts as they have a corresponding or identical counterpart in the foregoing first embodiment.

In FIG. 3, indicated at $31a$ to $31n$ are switch means, including first switch elements $32a$ to $32n$ which are operated to connect a plural number of pyroelectric infrared sensors $1a$ to in sequentially to one differential amplifier circuit 21, and second switch elements $33a$ to $33n$ which are operated to connect a plural number of low-pass filter circuits $11a$ to $11n$ sequentially to the single differential amplifier circuit 21.

Denoted at 34 is an oscillator which serves to produce a signal for sequentially opening and closing the switches $31a$ to $31n$ at a predetermined switching frequency f0.

The pyroelectric infrared sensor signal processor 10' of this embodiment, with the above-described arrangements, operates basically in the same manner as the foregoing first embodiment.

More specifically, for the signal processing operation, drain terminals of the respective pyroelectric infrared sensors $1a$ to $1n$ are connected to the corresponding low-pass filter circuits $11a$ to $11n$, which are each put in a normally operative condition quickly by the action of the aforementioned switching element 12.

Thereafter, according to the switching frequency f0 generated by the oscillator 34, the switches $31a$ to $31n$ are sequentially actuated to close the first switching elements $32a$ to $32n$ and the second switching elements $33a$ to $33n$ in a synchronized fashion, respectively. By this switching operation, input signals Vin from a plural number of pyroelectric infrared sensors $1a$ to $1n$ are sequentially fed to one differential amplifier circuit 21 along with a DC component VDC of a corresponding input signal. As a consequence, only an AC component in each one of the input signals Vin from a plural number of pyroelectric infrared sensors $1a$ to in is similarly amplified through one common differential amplifier circuit 21.

The low-pass filter circuits $11a$ to $11n$ each with a capacitor C11 are located in a stage preceding the switches $31a$ to $31n$ and the differential amplifier circuit 21, so that the capacitors $11c$ of the respective low-pass filter circuits $11a$ to $11n$ are constantly charged with signals from the corresponding infrared sensors $1a$ to $1n$. Accordingly, as soon as the infrared sensors 1a to 1n and the low-pass filter circuits 11a to 11b are sequentially connected to the differential amplifier circuit 21 by operations of the switches 31a to 31n, one can instantly pick up output voltages Vout which correspond to the input signals Vin from the respective infrared sensors 1a to 1n, because the capacitors C11 of the respective low-pass filter circuits 11a to 11n are always in a charged state. Further, even if the switching frequency f0 under control of the oscillator 34 is raised to operate the switches 31a to 31n at a higher speed, the signal processor can produce output voltages Vout accordingly at an increased speed because each one of the low-pass filter circuits 11a to 11n is always available in an operative state as mentioned above, without necessitating a charging time for each capacitor C11.

Figure 4:
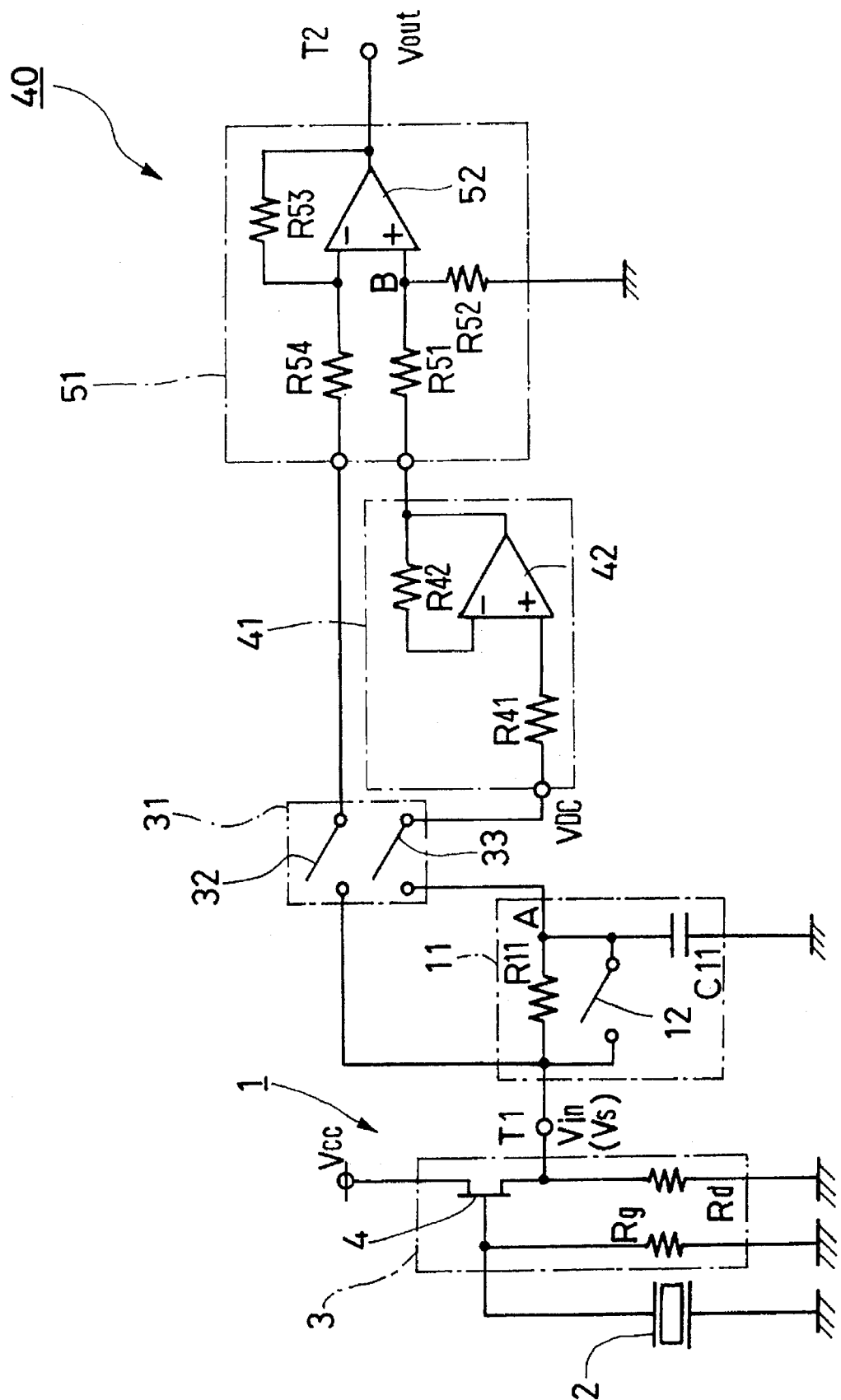
FIG. 4 is a circuit diagram of a third embodiment of the pyroelectric infrared sensor signal processor according to the present invention.
Figure 5A:
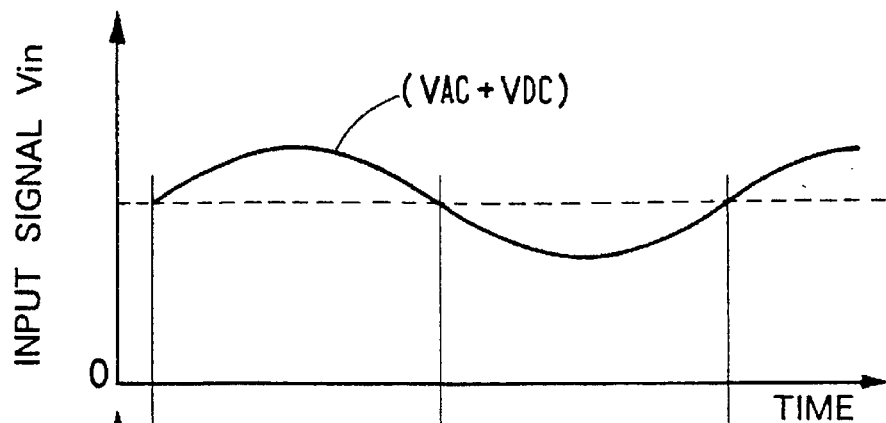
FIG. 5 shows waveform diagrams of an input signal received from a pyroelectric infrared sensor as in FIG. 4, a DC signal passed through a low-pass filter circuit, and an output voltage of a differential amplifier circuit.
Figure 5B:
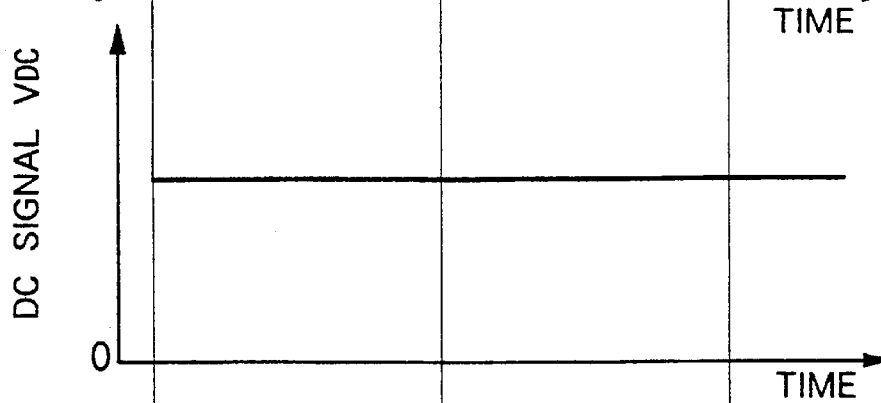
Figure 5C:
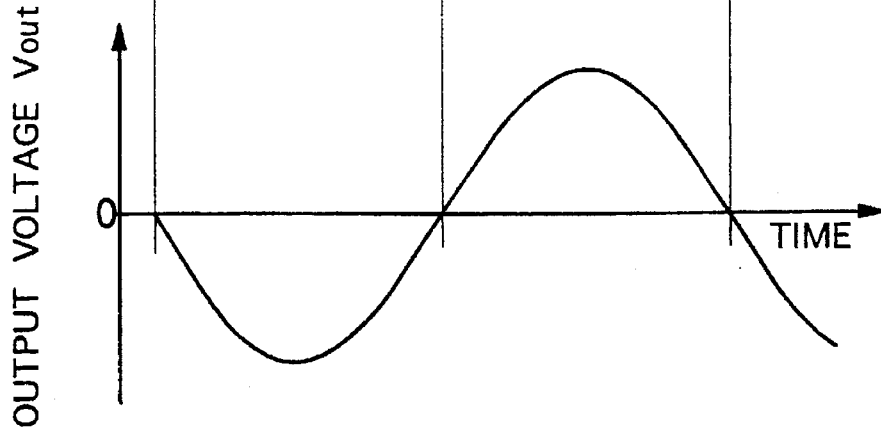

Referring now to FIGS. 4 and 5, there is shown a third embodiment of the invention, characterized by the provision of a buffer circuit connected between a low-pass filter circuit and a differential amplifier circuit, which has an inverting input terminal of an OP AMP connected to ground.

In the following description of the third embodiment, those component parts which are common with the foregoing first embodiment are simply designated by common reference numerals or characters without repeating similar explanations.

In these figures, denoted at 40 is a pyroelectric infrared sensor signal processor of the third embodiment, which is largely constituted by: a low-pass filter circuit 11 which is connected in a stage immediately succeeding an infrared sensor 1, a buffer circuit 41 which is connected to the low-pass filter circuit 11 through a switch 31 as will be described in greater detail hereinlater, and a differential amplifier circuit 51.

More specifically, the buffer circuit 41 is constituted by an OP AMP 42, and resistors R41 and R42. In this instance, the noninverting input terminal of OP AMP 42 is connected to a voltage dividing point A between resistor R11 and capacitor C11 of a low-pass filter circuit 11 through the resistor R41 and a second switching element 33. The resistor R42 is connected in a feedback path between the output and inverting input terminals of OP AMP 42. This buffer circuit 41 functions to preclude such interferences as would result from mutual influences of a DC signal VDC output from the low-pass filter circuit 11 and an AC signal output from the differential amplifier circuit 51.

Indicated at 51 is a differential amplifier circuit which is constituted by an OP AMP 52, an input resistor R51 connected to the noninverting input terminal of OP AMP 52, a grounding resistor R52 connected between a junction point of the input resistor R51 with the noninverting input terminal of OP AMP 52 and ground, a negative feedback resistor R53 connected between the output and inverting input terminals of OP AMP 52, and an input resistor 54 connected to the inverting input terminal of OP AMP 52. The input resistor R51 and grounding resistor R52 form a series resistor circuit which is connected to the noninverting input terminal of OP AMP 52 at a voltage dividing point B.

With the arrangements as described above, the pyroelectric infrared sensor signal processor 40 of this embodiment can produce the same effects in operation as the foregoing first embodiment.

More specifically, in this embodiment, the input impedance of the buffer circuit 41 is set at an extremely large value, so that almost no current flow takes place, precluding mutual influences which would otherwise occur between the low-pass filter circuit 11 and the differential amplifier circuit 51. Namely, for instance, a DC signal VDC at the voltage dividing point A between the resistor R11 and the capacitor C11 of the low-pass filter circuit 11 has the characteristics as shown at (b) of FIG. 5, and, owing to the provision of the buffer circuit 41, that DC signal VDC is supplied to the input resistor R51 of the differential amplifier circuit 51 as it is without undergoing changes in characteristics.

Further, at the noninverting input terminal of OP AMP 52, the differential amplifier circuit 51 is supplied with a partial voltage of the DC signal VDC as divided through the input resistor R51 and grounding resistor R52. Therefore, only a differential signal between the input signal Vin and the partial voltage of the DC signal, which is regarded substantially as a DC component, is amplified at a predetermined amplification factor, which is determined by the resistance values of the resistors R51, R52, R53 and R54. The output voltage Vout after amplification can be defined as in Expression 3 below.

$$Vout = -\frac{R53}{R54} \times Vin + \frac{R52(R53+R54)}{R54(R51+R52)} \times VDC \quad \text{[Expression 3]}$$

In case the differential amplifier circuit 51 employs resistors R51, R52, R53 and R54 of resistance values R51=R54 and R52=R53 to have an amplification factor β (R53/R54), the output voltage Vout can be defined as in Expression 4 below.

$$\begin{aligned} Vout &= -\beta \times VAC \quad \text{[Expression 4]} \\ &= -\frac{R53}{R54} \times (Vin - VDC) \end{aligned}$$

Similarly, at the output terminal of the signal processor 40 of this embodiment, one can pick up an output voltage Vout which contains an AC component alone at an amplified level, as compared with a corresponding input signal Vin shown at (a) of FIG. 5. Accordingly, in this case, the output voltage Vout has the characteristics as shown at (c) of the same figure.

Further, in the signal processor 40 of this embodiment, the buffer circuit 41 which is connected between the low-pass filter circuit 11 and the differential amplifier circuit 51 serves to preclude electrical troubles which might result from interferences between DC signals from the low-pass filter circuit 11 and signals from the differential amplifier circuit 51.

Furthermore, in the above-described arrangements, the differential amplifier circuit 51 is capable of amplifying only an AC component VAC of the input signal Vin at an amplification factor β without adding the DC signal VDC to the output voltage Vout.

Figure 6:
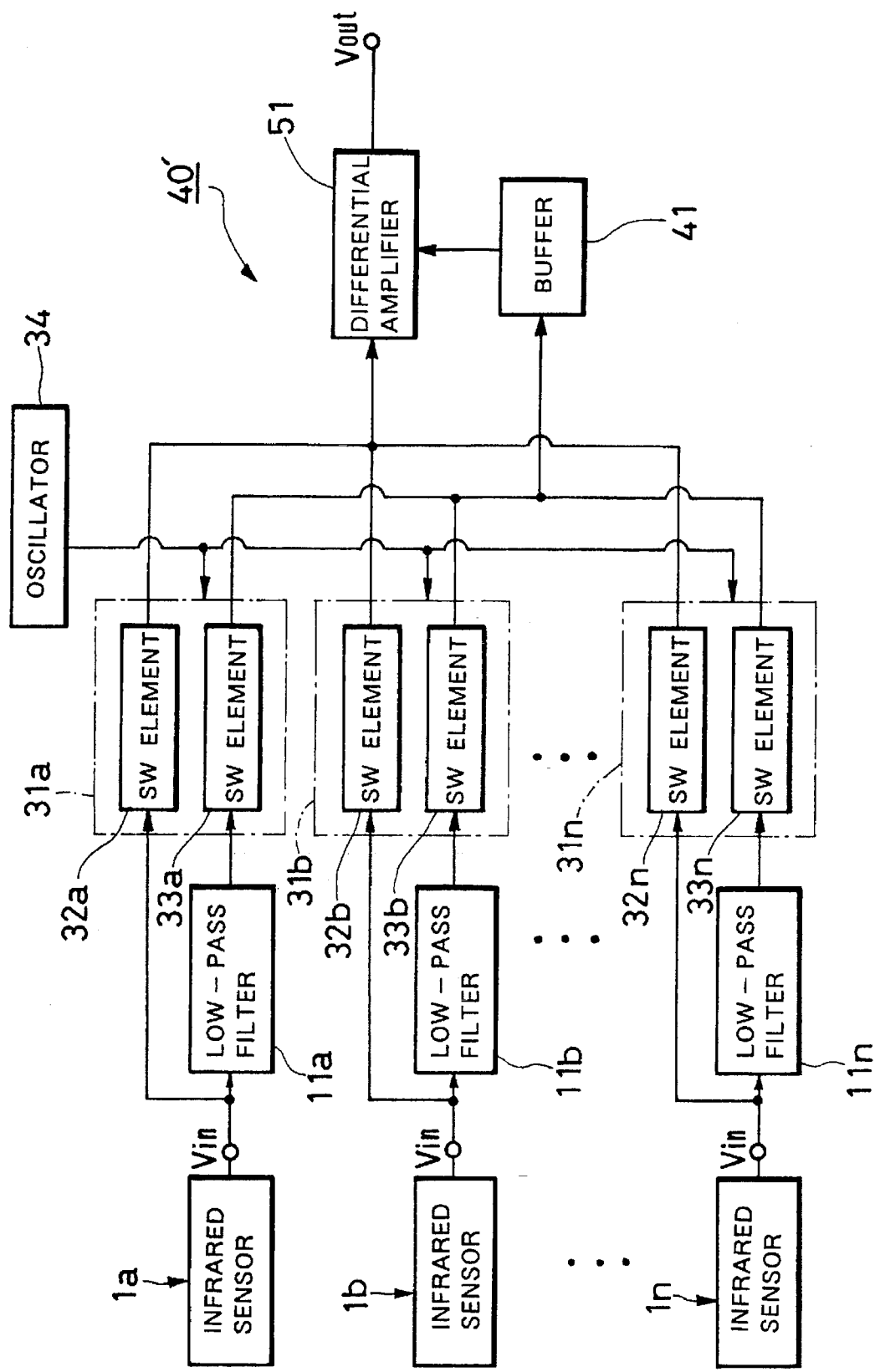
FIG. 6 is a block diagram of a fourth embodiment of the pyroelectric infrared sensor signal processor according to the present invention.

Referring now to FIG. 6, there is shown a fourth embodiment of the present invention. In the following description of the fourth embodiment, those component parts which are common with the foregoing embodiments are simply designated by common reference numerals or characters without repeating similar explanations.

Namely, indicated at 40' is a signal processor of this embodiment for amplifying output signals Vs (Vin) from a plural number of pyroelectric infrared sensors 1a to 1n, the signal processor being characterized by the provision of a plural number of low-pass filter circuits 11a to 11n which are connected to the respective infrared sensors 1a to 1n in a one-on-one fashion, feeding DC output signals VDC from the respective low-pass filter circuits 11a to 11n sequentially and cyclically to a single differential amplifier circuit 51 through a plural number of switches 31a to 31n. This embodiment is also characterized by the provision of a buffer circuit 41 which is interposed between the low-pass filter circuits 11a to 11n and the differential amplifier circuit 51.

In this embodiment with the above-described arrangements, the switches 31a to 31n operated to switch the connections of the paired first and second switching elements 32a to 32n and 33a to 33n sequentially in a synchronized fashion. By so doing, input signals Vin from the respective pyroelectric infrared sensors 1a to 1n as well as DC signals VDC from the respective low-pass filter circuits 11a to 11n are successively fed to one buffer circuit 41 and one differential amplifier circuit 51. Consequently, as the input signals Vin from the respective pyroelectric infrared sensors 1a to 1n are sequentially processed through one common buffer circuit 41 and one common differential amplifier circuit 51, only AC components of the input signals are quickly amplified and appear as output voltages Vout at the output terminal of the signal processor.

Figure 7:
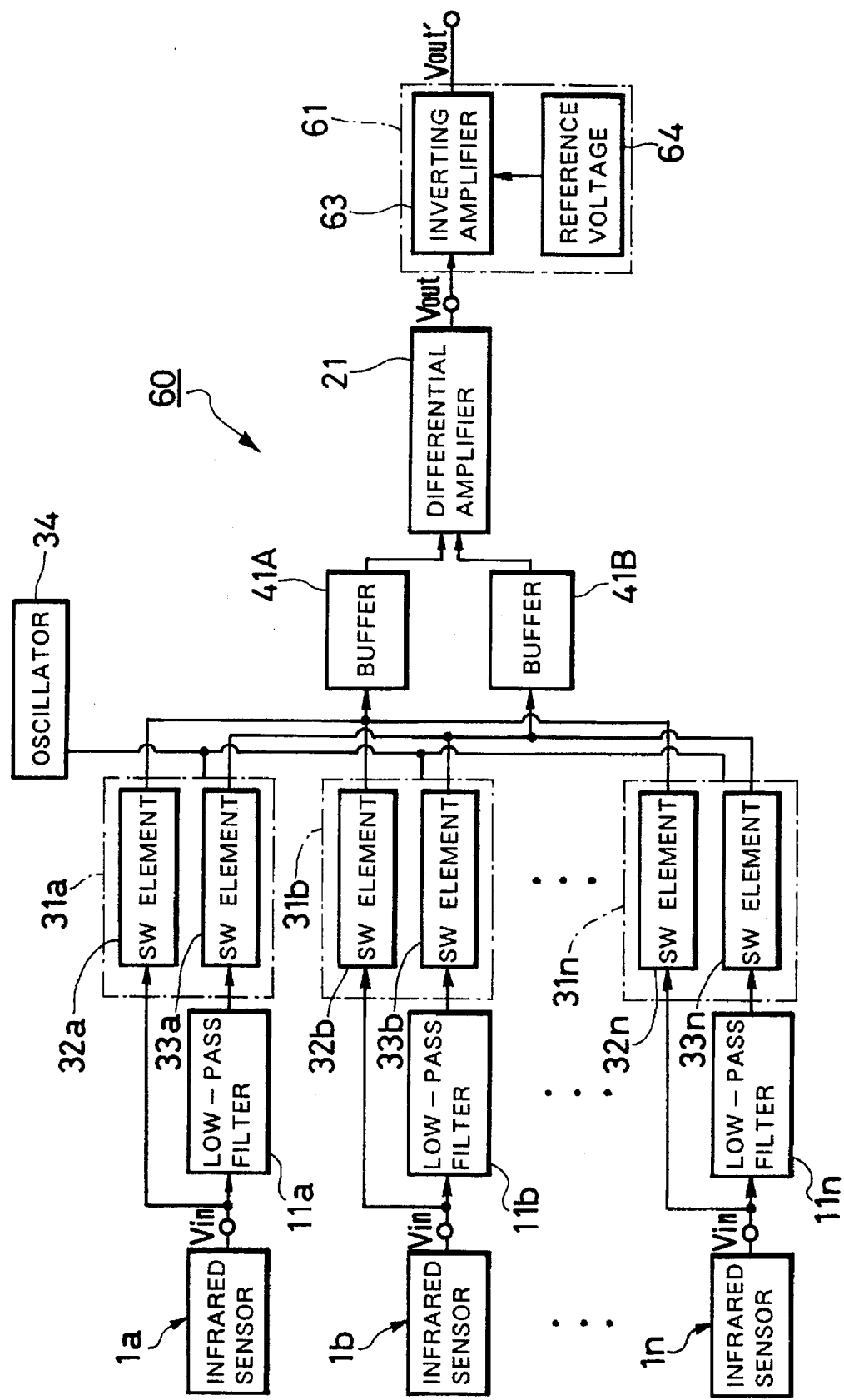
FIG. 7 is a block diagram of a fifth embodiment of the pyroelectric infrared sensor signal processor according to the present invention.
Figure 8:
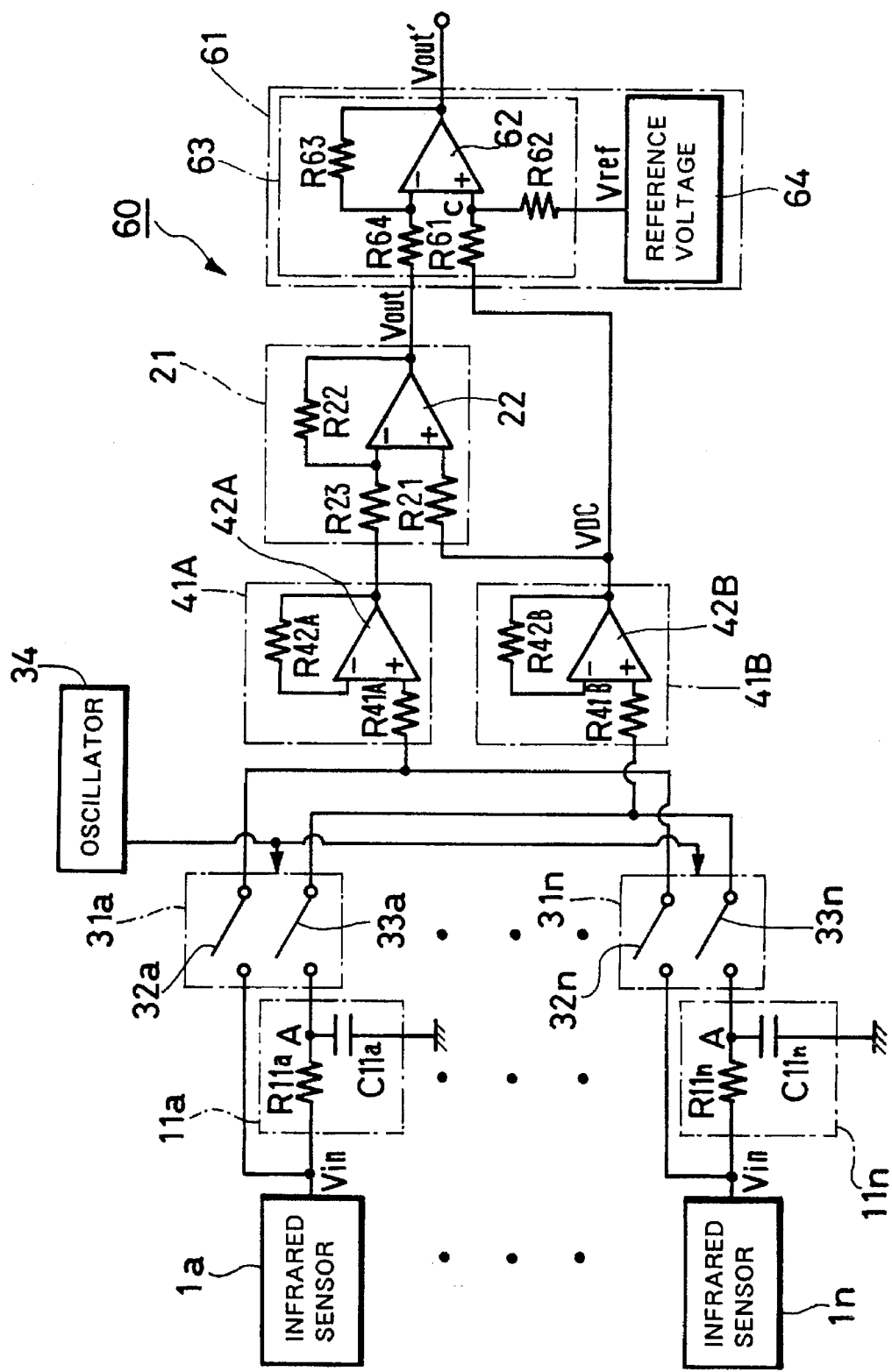
FIG. 8 is a circuit diagram of the fifth embodiment shown in FIG. 7.
Figure 9A:
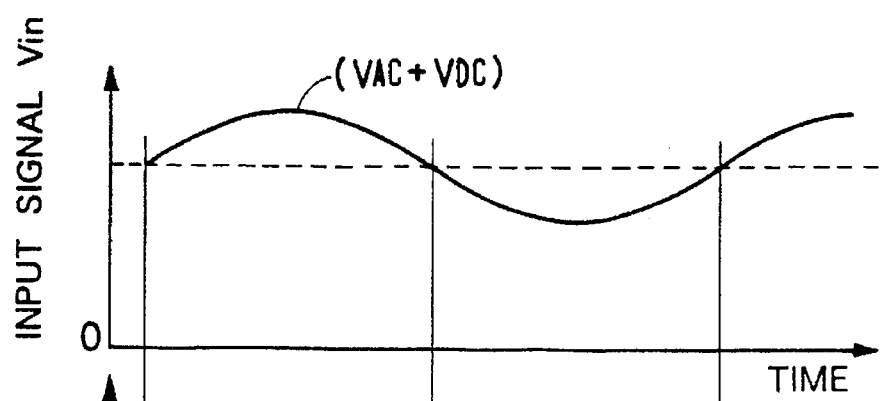
FIG. 9 shows waveform diagrams of an input signal received from a pyroelectric infrared sensor as in FIG. 8, a DC signal passed through a low-pass filter circuit, an output voltage produced by a differential amplifier circuit, and an output voltage produced by a DC biasing circuit.
Figure 9B:
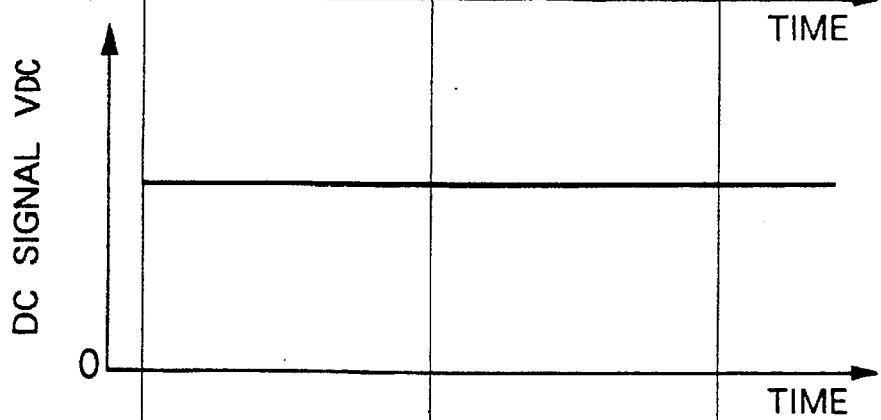
Figure 9C:
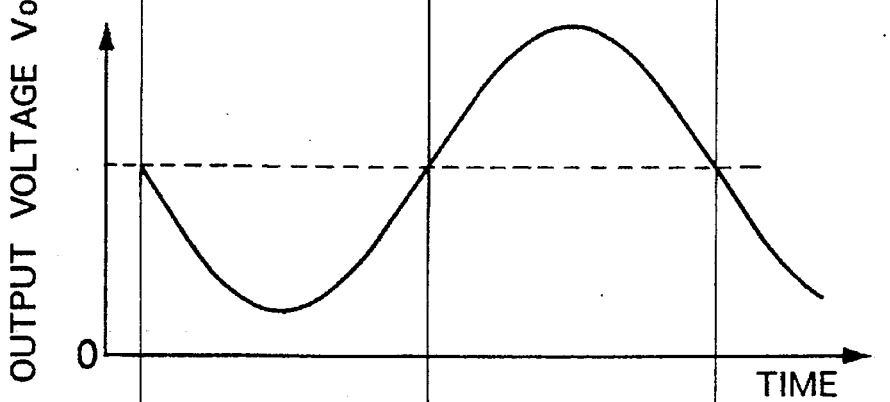
Figure 9D:
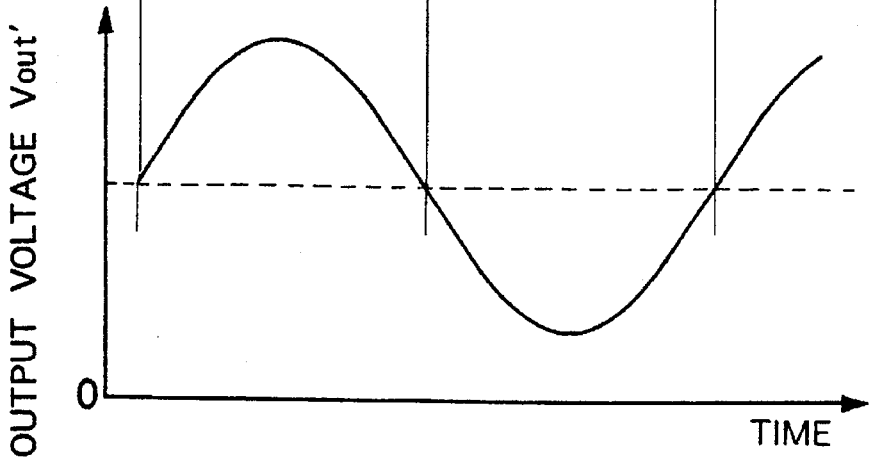

Illustrated in FIGS. 7 to 9 is a fifth embodiment of the present invention, which is characterized by the provision of a DC biasing circuit connected in a stage immediately succeeding a differential amplifier circuit.

In the following description of the fifth embodiment, those component parts which are common with the foregoing embodiments are simply designated by common reference numerals or characters without repeating similar explanations.

In these figures, indicated at 60 is a pyroelectric infrared sensor signal processor, which is largely constituted by: a number of low-pass filter circuits 11a to 11n each connected in a stage immediately succeeding a corresponding one of the infrared sensors 1a to 1n; a buffer circuit 41a connected to the infrared sensors 1a to 1n through first switching elements 32a to 32n of switches 31a to 31n; another buffer circuit 41 connected to the low-pass filter circuits 11a to 11n through second switching elements 33a to 33n of the switches 31a to 31n; a differential amplifier circuit 21 connected to the respective buffer circuits 41A and 41B; and a DC biasing circuit connected in a stage immediately succeeding the differential amplifier circuit 21 as a DC bias application means.

The above-mentioned switches 31a to 31n are put in a switching operation at a frequency which is produced by an oscillator 34.

In this instance, a couple of low-pass filter circuits 11a and 11n are shown in FIG. 8 as representatives of the low-pass filter circuits 11a to 11n each one of which is arranged in the same network as in the first embodiment described hereinbefore. Namely, the low-pass filter circuit 11a is arranged in an L-type network having a resistor R11a and a capacitor C11a connected in series, and the low-pass filter circuit 11n is likewise arranged in a similar L-type network having a resistor R11n and a capacitor C11n connected in series. In the low-pass filter circuits 11a to 11n, all of the resistors R11a to R11n are of the same resistance value, and all of the capacitors C11a to C11n are of the same capacitance.

The buffer circuits 41A and 41B are arranged in the same manner as the buffer circuit 41 in the foregoing third embodiment. More specifically, the buffer circuit 41A is constituted by an OP AMP 42A, a resistor R41A connected to the noninverting input terminal of OP AMP 42A, and a resistor R42A connected between output and inverting input terminals of OP AMP 42A, while the other buffer circuit 41B is constituted by an OP AMP 42B, a resistor R41B connected to the noninverting input terminal of OP AMP 42B, and a resistor R42B connected between output and inverting input terminals of OP AMP 42B. The resistors R41A and R41B as well as the resistors R42A and R42B are of the same resistance value.

Further, similarly to the differential amplifier circuit 21 of the first embodiment described above, the differential amplifier circuit 21 of this embodiment is constituted by an OP AMP 22, an input resistor R21, a negative feedback resistor R22, and another input resistor R23.

At the output terminal of the differential amplifier circuit 21, one can obtain an output voltage Vout of the characteristics as shown at (c) of FIG. 9, which can be defined as in Expression 5 below similarly to Expression 2 given before.

$$\text{Vout} = -\alpha \times VAC + VDC \qquad \text{[Expression 5]}$$
$$= -\frac{R22}{R23} \times VAC + VDC$$

Turning now to the DC biasing circuit 61 which is employed in this embodiment, this DC biasing circuit 61 is constituted by an inverting amplifier circuit 63 with an OP AMP 62 and a reference voltage circuit 64. In turn, the inverting amplifier circuit 63 is constituted by an input resistor R61, a resistor R62, a negative feedback resistor R63 and another input resistor R64. The input resistor R61 is connected to the noninverting input terminal of OP AMP 62. The resistor R62 is connected between a junction point of the input resistor R61 with the noninverting terminal and the reference voltage circuit 64 which will be described hereinafter. The negative feedback resistor R63 is connected between the output terminal and inverting input terminal of OP AMP 62. The other resistor R64 is connected between the differential amplifier circuit 21 and the inverting input terminal of OP AMP 62. The input resistor R61 and resistor R62 form a series resistor circuit which is connected to the noninverting input terminal of OP AMP 62 at a voltage dividing point C.

The reference voltage circuit 64 is provided for the purpose of supplying a reference voltage Vref to the inverting amplifier circuit 63.

The DC biasing circuit 61 of the above-described arrangements produces an output voltage Vout' of the characteristics as shown at (d) of FIG. 9, which can be defined as in Expression 6 below.

$$\text{Vout}' = -\frac{R63}{R64} \times \text{Vout} + \frac{R63}{R61} \times VDC + \frac{R63}{R62} \times Vref \qquad \text{[Expression 6]}$$
$$= -\frac{R63}{R64} \times \left( -\frac{R22}{R23} \times VAC + VDC \right) +$$
$$\frac{R63}{R61} \times VDC + \frac{R63}{R62} \times Vref$$

The Expression 6 can be rewritten into a simpler form as in Expression 7 below.

$$\text{Vout}' = \frac{R22 \times R63}{R23 \times R64} \times VAC + \left( \frac{R63}{R61} - \frac{R63}{R64} \right) \times \qquad \text{[Expression 7]}$$
$$VDC + \frac{R63}{R62} \times Vref$$

In this instance, if R61=R64, the Vout' becomes as in Expression 8 below.

$$\text{Vout}' = \frac{R22 \times R63}{R23 \times R64} \times VAC + \frac{R63}{R62} \times Vref \qquad \text{[Expression 8]}$$

As will be gathered from foregoing Expression 8, in this case, the signal processor 60 produces an output voltage, Vout' at the output terminal of the DC biasing circuit 61, by subtracting the output DC signal VDC of the low-pass filter circuit 11 from the output voltage Vout of the differential amplifier circuit 21 and adding thereto the reference voltage Vref from the reference voltage circuit 64.

In the present embodiment, with the above-described arrangements, the signal processor 60 is capable of producing an output voltage Vout' which is, as defined by Expression 8, freed from dependency on the output DC signal VDC of the low-pass filter circuit 11 to preclude fluctuations which might exist in the output voltage Vout.

Accordingly, even if fluctuations are present in the output signals Vs of the infrared sensors 1a to 1n, it becomes possible to prevent similar fluctuations from occurring in the DC components of corresponding output voltages Vout' which are produced at the output terminal of the signal processor 60, permitting to obtain output voltages Vout' which accurately reflect variations in AC signals VAC from the respective infrared sensors 1a to 1n.

Further, as the input signals Vin are sequentially received from the respective infrared sensors 1a to 1n through the switches 31a to 31n which are operated at the switching frequency f0, the differences of DC signals VDC which are contained in ths input signals Vin can be reduced by following method. Namely, when the allowable difference value of DC signals VDC which are contained in the input signals Vin is indicated as ΔV, the allowable difference value ΔV is defined in Expression 9 below.

$$\Delta V \geq K \times f0 \times \Delta VDC \times \frac{R22 \times R63}{R23 \times R64} \times Rf \qquad \text{[Expression. 9]}$$

where K is a constant.

In this manner, the switches 31a to 31n can be operated at a high speed while suppressing irregularities of the allowable difference value ΔV in DC voltage level to a narrow range by making suitable settings according to Expression 9 above with regard to the switching frequency f0, the difference. ΔVDC between the maximum and minimum values of DC voltage level, the amplification factor through the differential amplifier circuit 21 and inverting amplifier circuit 63, and the resistance value Rf in each of the low-pass filter circuits 11a to 11n.

Figure 10:
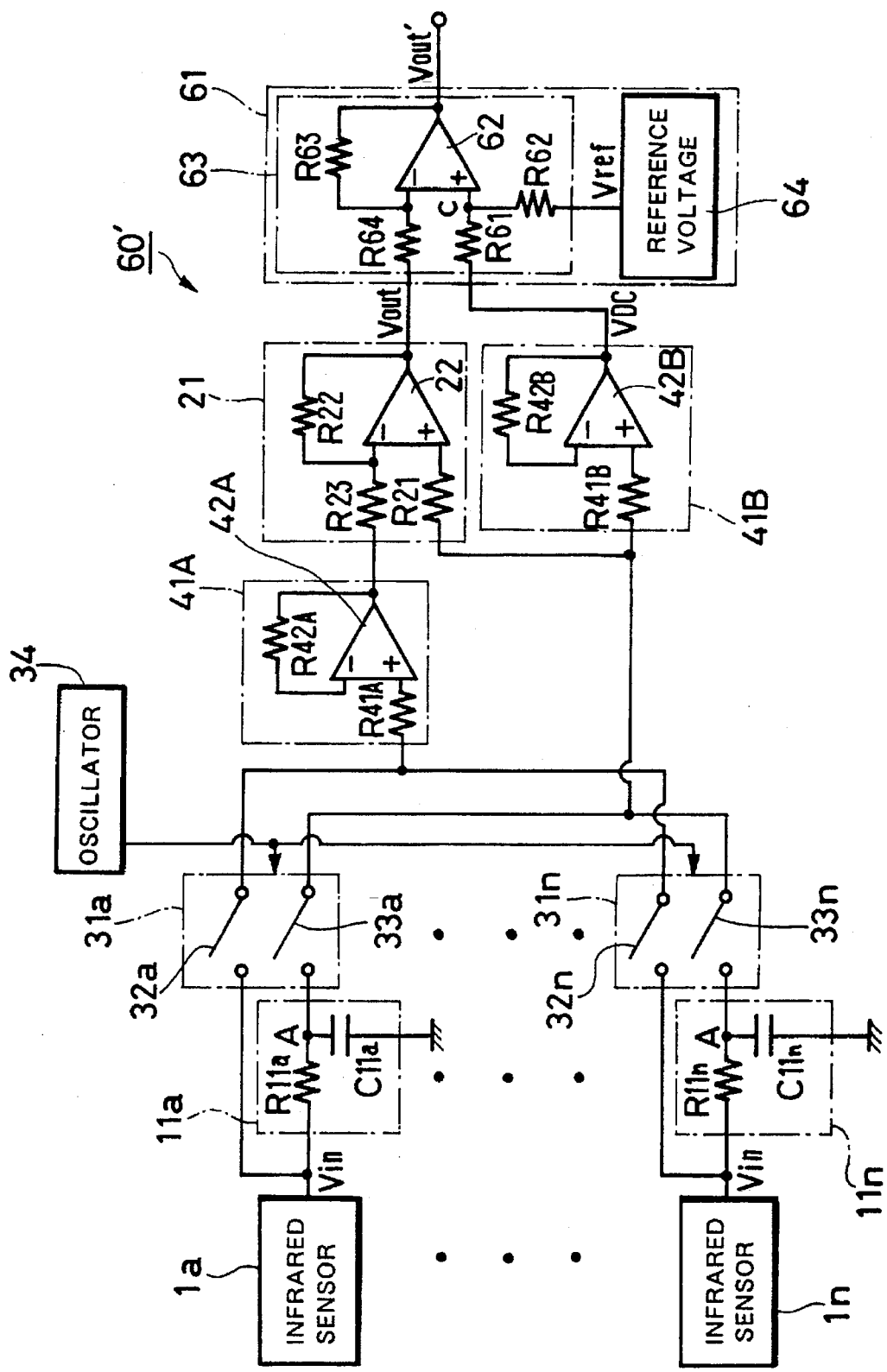
FIG. 10 is a circuit diagram of a sixth embodiment of the pyroelectric infrared sensor signal processor according to the present invention.

Referring now to FIG. 10, there is shown a signal processor 60' as a sixth embodiment of the present invention, which has a buffer circuit 41B located closer to a DC biasing circuit 61 to connect a noninverting input terminal of an OP AMP 22 to a low-pass filter circuit 11 through a second switching element.

By means of the above-mentioned buffer circuits 41A and 41B, the signal processor 60' of this sixth embodiment of the present invention can produce the same operational effects as in the foregoing fifth embodiment in preventing electrical interferences between the low-pass filter circuits 11 and the DC biasing circuit 61.

Figure 11:
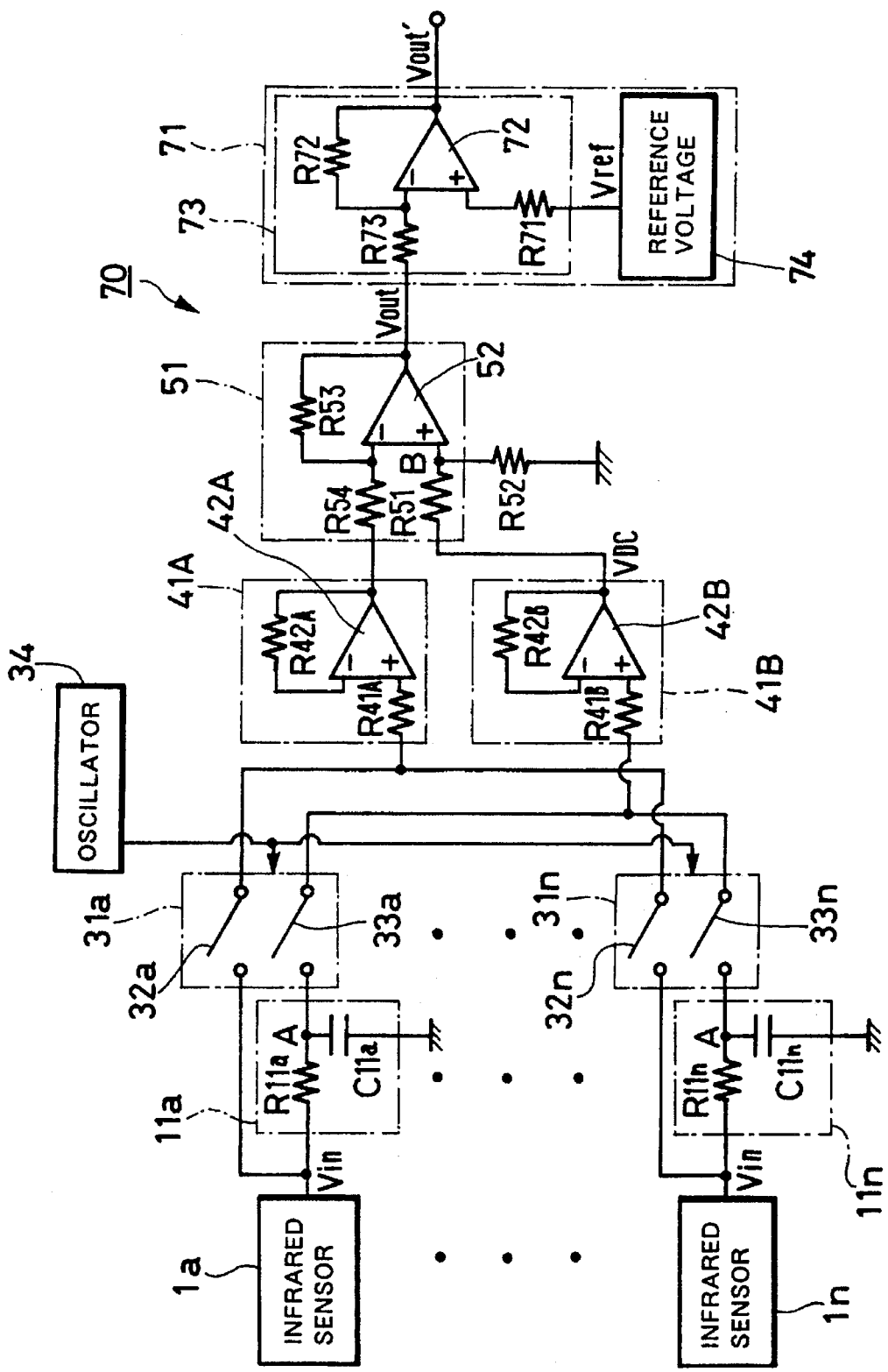
FIG. 11 is a circuit diagram of a seventh embodiment of the pyroelectric infrared sensor signal processor according to the present invention.
Figure 12:
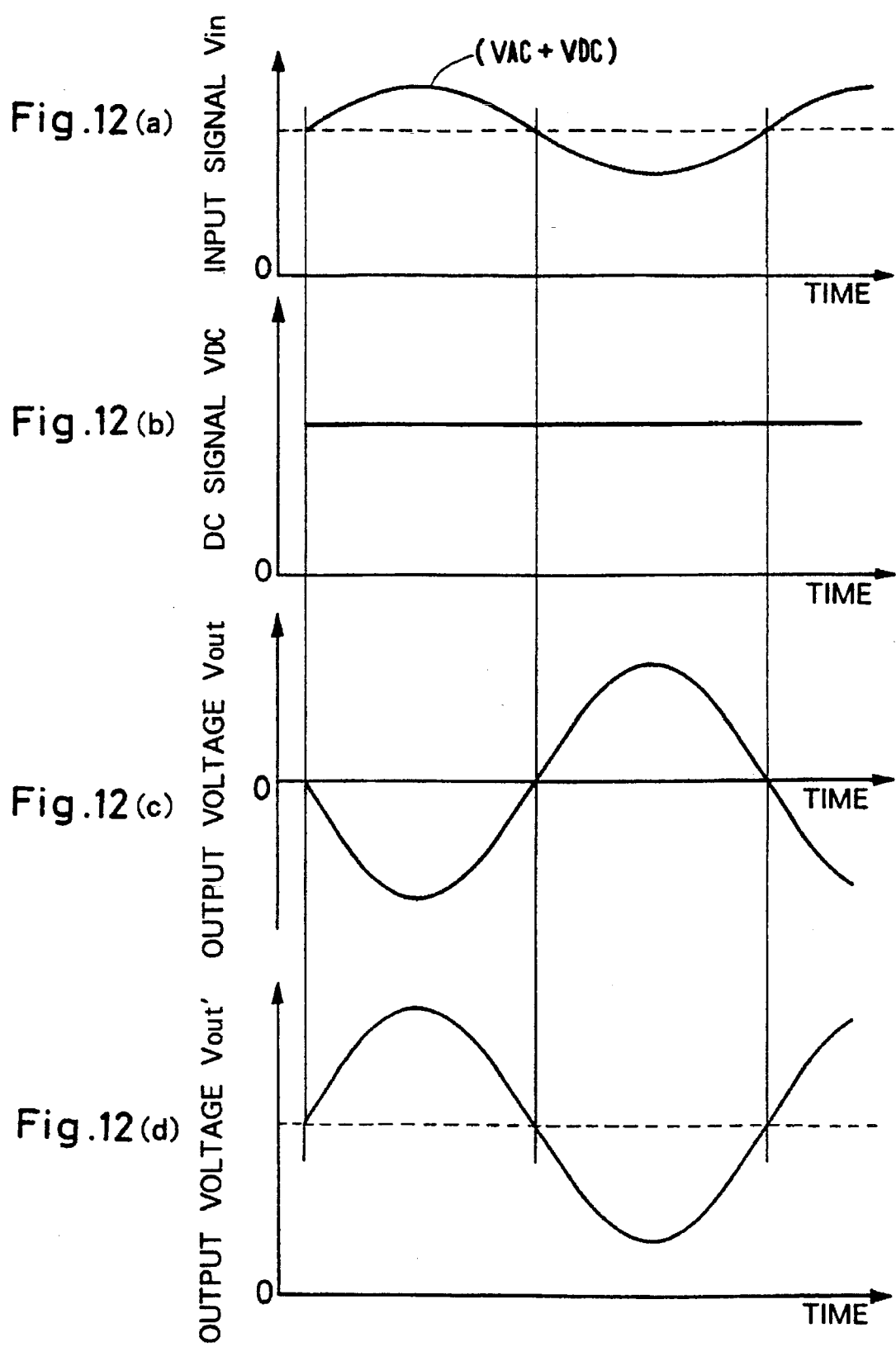
FIG. 12 shows waveform diagrams of an input signal received from pyroelectric infrared sensor as in FIG. 11, a DC signal passed through a low-pass filter circuit, an output voltage produced by a differential amplifier circuit, and an output voltage produced by a DC biasing circuit.

Further, shown in FIGS. 11 and 12 is a signal processor 70 as a seventh embodiment of the present invention, which employs the differential amplifier circuit 51 of the foregoing third embodiment as an AC amplifier means, in combination with a DC biasing circuit 71 which is connected in a final stage of the processor as a DC biasing means.

In the following description of the seventh embodiment, similarly the component parts which are common with the foregoing embodiments are simply designated by common reference numerals or characters without repeating similar descriptions.

In this case, at the output terminal of the differential amplifier circuit 51, one can obtain an output voltage Vout of the characteristics as shown at (c) of FIG. 12, which can be defined as in Expression 10 below.

$$\begin{aligned} Vout &= -\alpha \times VAC \qquad \text{[Expression 10]} \\ &= -\frac{R53}{R54} \times VAC \end{aligned}$$

Similary to the foregoing fifth embodiment, the DC biasing circuit 71 is constituted by an inverting amplifier circuit 73 with an OP AMP 72 and a reference voltage circuit 74. In this embodiment, the inverting amplifier circuit 73 is constituted by a resistor R71, a negative feedback resistor R72, and an input resistor R73. The resistor R72 is connected between the noninverting input terminal of OP AMP 72 and the reference voltage circuit 74. The negative feedback resistor R72 is connected between the output and inverting input terminals of OP AMP 72. The input resistor R73 is connected between the differential amplifier circuit 51 and the inverting input terminal of OP AMP 72.

Thereafter, at the DC biasing circuit 71, each one of received output voltages Vout is multiplied therethrough at a predetermined amplification factor γ (R72/R73), and then added with a reference voltage Vref to produce a DC biased output voltage Vout'.

As a consequence, at the output terminal of the DC biasing circuit 71 in a final stage of the signal processor, one can pick up an output voltage Vout' which is of the characteristics as shown at (d) of FIG. 12, and which can be defined as in Expression 11 below.

$$\begin{aligned} Vout' &= -\gamma \times Vout + \frac{R72}{R71} \times Vref \qquad \text{[Expression 11]} \\ &= -\frac{R72}{R73} \times Vout + \frac{R72}{R71} \times Vref \\ &= \frac{R53}{R54} \times \frac{R72}{R73} \times VAC + \frac{R72}{R71} \times Vref \\ &= \beta \times \gamma \times VAC + \frac{R72}{R71} \times Vref \end{aligned}$$

In this manner, at the DC biasing circuit 71, a reference voltage Vref from the reference voltage circuit 74 is added to the output voltage Vout from the differential amplifier circuit 51 to obtain, ultimately from the signal processor 70, an output signal Vout' as defined by foregoing Expression 11.

Namely, as will be gathered from Equation 11, the signal processor 70 of this embodiment is capable of producing output signals Vout' which are freed from dependency on the DC signals from the low-pass filter circuits 11, so that the output voltages Vout' coming out of the DC biasing circuit 71 accurately reflect the original signals from the infrared sensors 1a to 1n, uninfluenced by fluctuations which might exist in DC signals in the output voltages Vout which are successively produced by the differential amplifier circuit 51 for the input signals from the respective infrared sensors 1a to 1n.

Figure 13:
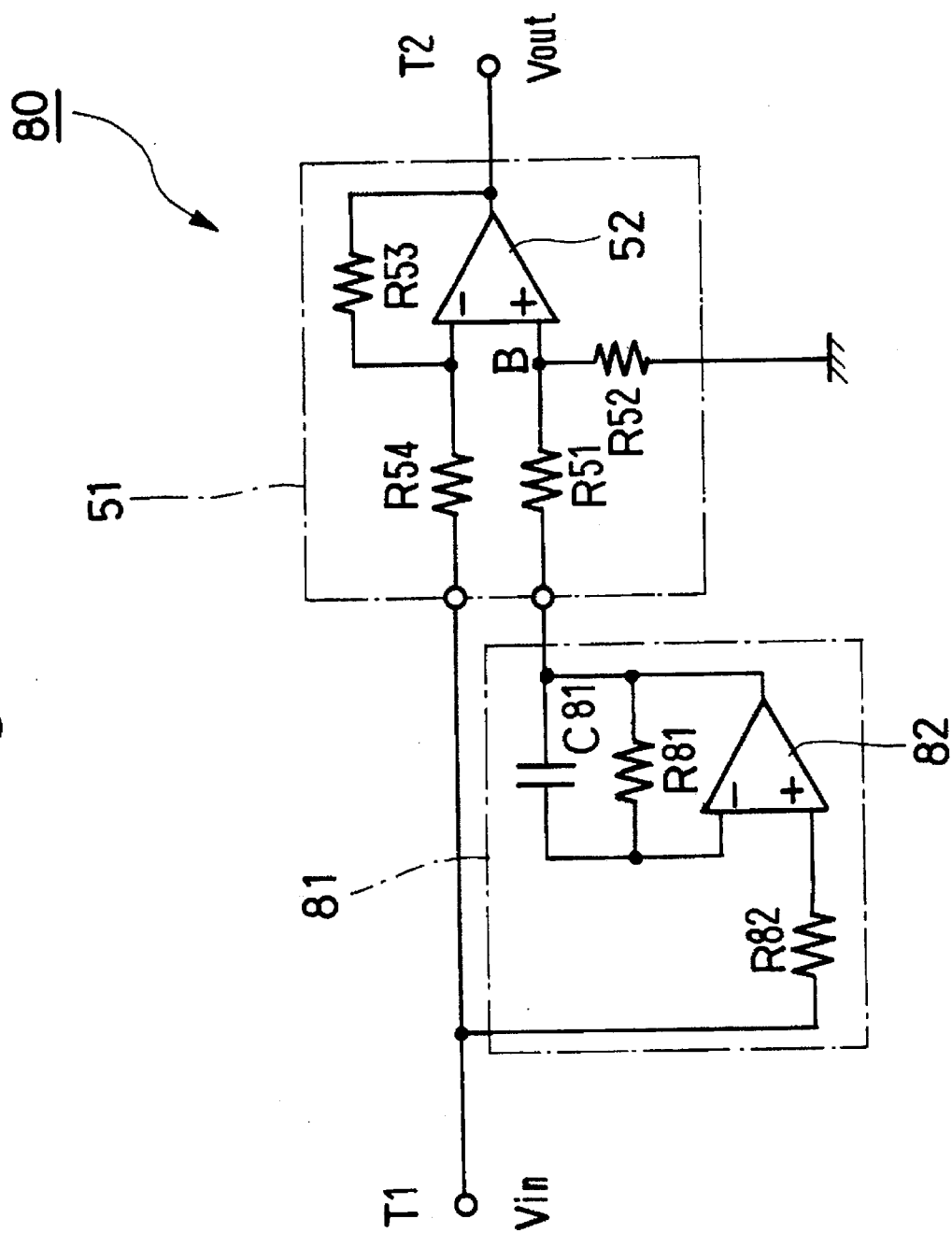
FIG. 13 is a circuit diagram of an eighth embodiment of the pyroelectric infrared sensor signal processor according to the present invention.
Figure 14:
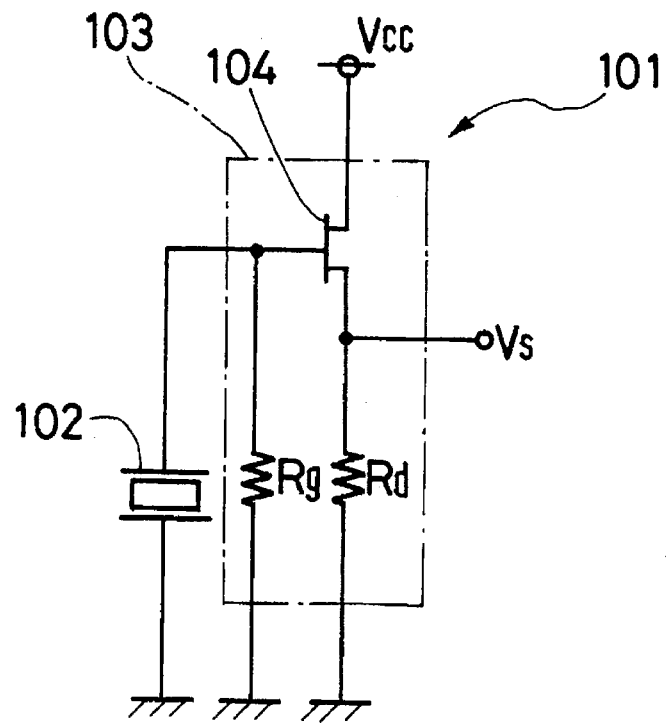
FIG. 14 is a circuit diagram of a conventional element and an impedance transformer circuit.
Figure 15:
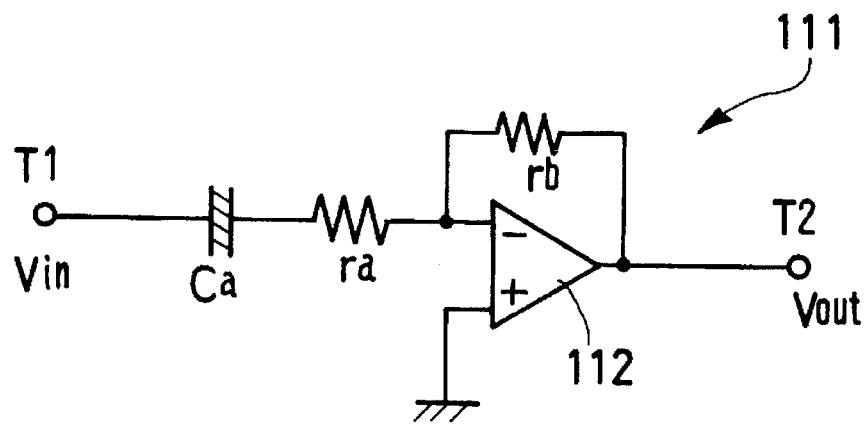
FIG. 15 a circuit diagram of a conventional pyroelectric infrared sensor signal processor.

Turning now to FIG. 13, there is shown a signal processor 80 as an eighth embodiment of the invention, which is characterized by the provision of a low-pass filter circuit employing an OP AMP.

In the following description of the eighth embodiment, similarly those components which are common with the foregoing embodiments are designated simply by common reference numerals or characters without repeating similar explanations.

As seen in FIG. 13, the signal processor 80 of this embodiment is constituted by a low-pass filter circuit 81 and a differential amplifier circuit 51 which is arranged in the same manner as in the third embodiment described above.

The low-pass filter circuit 81, serving as a DC output means, is constituted by an OP AMP 82, a resistor R81 connected between the output and inverting input terminals of OP AMP 82, a capacitor C81 connected parallel with the resistor R81, and an input resistor R82 connected between the noninverting input terminal of OP AMP 82 and an input terminal T1. The low-pass filter circuit 81 has a preset cut-off frequency which is determined by the resistance value of the resistor R81 and the electrostatic capacitance of the capacitor C81. The output terminal of OP AMP 82 is connected to the differential amplifier circuit 51.

The signal processor 80 of this embodiment operates in the manner as follows.

Upon turning on a power supply for the differential amplifier circuit 51, an input signal Vin is fed to the low-pass filter circuit 81, which passes on a DC signal component of the input signal Vin below a predetermined cut-off frequency fc. The cut-off frequency fc can be set at a suitable value by way of the resistance value of the resistor R81 and electrostatic capacitance of the capacitor C81, according to Expression 12 below.

$$fc = \frac{1}{2\pi \times R81 \times C81} \text{ (Hz)} \qquad \text{[Expression 12]}$$

Further, the noninverting input terminal of OP AMP 52 of the differential amplifier circuit 51 is applied with a partial voltage of the DC signal VDC as divided by the input resistor R51 and grounding resistor R52. As a consequence, a differential signal between the input signal Vin and the partial voltage of the DC signal VDC, which is considered to be substantially a DC component, is amplified at an amplification factor which is determined by the resistance values of the resistors R51, R52, R53 and R54. The output voltage Vout can be defined in a manner similar to Expression 4 given hereinbefore, and, in case the resistance values for the resistors R51 to R54 are set as R51=R54 and R52=R53, the output voltage Vout is defined in Expression 13 below.

$$\begin{aligned}Vout &= -\beta \times VAC \qquad \text{[Expression 13]} \\ &= -\frac{R53}{R54} \times (Vin - VDC)\end{aligned}$$

Thus, even in the case as the present embodiment employing the above-described low-pass filter circuit 81, upon supplying an input signal Vin to the signal processor, one can obtain an output voltage Vout which contains only an AC component of the input signal Vin at an amplified level.

Needless to say, the L-type low-pass filter circuits shown in the preceding embodiments may be replaced by the low-pass filter network 81 of FIG. 13, if desired.

Industrial Applicability

Summarizing the foregoing detailed description, the signal processor of the invention according to claim 1 is constituted by a low-pass filter circuit for passing on only a DC component in an input signal received from a pyroelectric infrared sensor, and a differential amplifier circuit for amplifying only an AC component of the input signal, on the basis of a DC signal from the low-pass filter circuit and the corresponding input signal received from the pyroelectric infrared sensor. Accordingly, without using a coupling capacitor as in the prior art counterpart shown before, one can obtain at the output terminal of the differential amplifier circuit an output signal which contains at an amplified level only an AC component of an input signal from a pyroelectric infrared sensor.

The signal processor of the invention according to claim 2 is constituted by a low-pass filter circuit for passing on only a DC component in an input signal received from a pyroelectric infrared sensor, a differential amplifier circuit for amplifying only an AC component of the input signal, on the basis of a DC signal from the low-pass filter circuit and the corresponding input signal received from the pyroelectric infrared sensor, and a DC biasing means adapted to apply a DC bias to an amplified AC signal output from the differential amplifier circuit to produce at its output terminal an output signal which has a DC bias added to the amplified AC signal. As a result, the output signal is freed from dependency on a DC component in the input signal to preclude fluctuations which might otherwise recur to the output signal.

The signal processor of the present according to claim 3 is constituted by a plural number of low-pass filter circuits connected in a one-on-one fashion to a plural number of pyroelectric infrared sensors to pass on only DC components of input signals from the respective infrared sensors, and a differential amplifier circuit sequentially connected to the respective low-pass filter circuits to output amplified AC components of the input signals on the basis of DC signals passed through the low-pass filter circuits and the corresponding input signals received from the respective pyroelectric infrared sensors. As a result, at the output terminal of the differential amplifier circuit, one can obtain amplified signals which contain at an amplified level only AC components of input signals received from the respective pyroelectric infrared sensors.

The signal processor of the invention according to claim 4 includes, in combination with a plural number of low-pass filter circuits correspondingly connected to a plural number of pyroelectric infrared sensors to pass on only DC components of input signals from the respective infrared sensors, a differential amplifier circuit arranged to be sequentially connected to the respective low-pass filter circuits to output amplified AC components of the input signals on the basis of DC signals passed through the respective low-pass filter circuits and the corresponding input signals received from the respective pyroelectric infrared sensors, and a DC biasing means arranged to apply a DC bias to AC signals output from the differential amplifier circuit to produce at its output terminal DC-biased signals each having a DC bias added to an amplified AC signal. As a result, the output signals can be freed from dependency on DC components in the input signals, and from fluctuations which might otherwise recur to output signals of the signal processor, thereby ensuring accurate signal detection by the processor.

The signal processor of the invention according to claim 5 includes a switching means connected between a plural number of pyroelectric infrared sensors and one common differential amplifier circuit, and a plural number of low-pass filter circuits and the differential amplifier circuit, the switch means being operated to connect the pyroelectric infrared sensors and the low-pass filter circuits sequentially to the differential amplifier circuit in a synchronized fashion. As a result, at the output terminal of the differential amplifier circuit, one can obtain amplified AC signals corresponding to AC components of the input signals which are sequentially received from the respective infrared sensors.

In the case of the signal processor of the invention according to claim 6, the DC biasing means is constituted by an inverting amplifier circuit in the form of an OP AMP, and a reference voltage circuit, thereby producing at the output terminal of the inverting amplifier circuit an output signal having a DC reference voltage added to an amplified AC signal. In this case, the output signal is also freed from dependency on a DC component in the corresponding input signal, and from fluctuations which might otherwise exist in DC components of input signals.

In the case of the signal processor of the invention according to claim 7, the low-pass filter circuit has a resistor and a capacitor connected in series for passing on only a DC component of an input signal while blocking an AC component thereof.

In the case of the signal processor of the invention according to claim 8, the low-pass filter circuit includes a switching element which is connected across the opposite ends of the resistor and which is closed to supply a relatively large current to the capacitor upon starting operation of the low-pass filter circuit, thereby cutting the charging time of the capacitor to shorten a warm-up period of the low-pass filter circuit.

In the case of the signal processor of the invention according to claim 9, the low-pass filter circuit is constituted by an OP AMP which likewise passes on only a DC component of an input signal while blocking an AC component thereof.

In the case of the signal processor of the invention according to claim 10, the inverting input terminal of the OP AMP of the differential amplifier circuit is connected to the output of the pyroelectric infrared sensor while the noninverting input terminal of the OP AMP is connected to the output end of the low-pass filter circuit, so that the differential amplifier circuit operates as an inverting amplifier circuit. Even in this case, at the output terminal of the differential amplifier circuit, similarly one can obtain an output signal which contains only an AC component of the input signal from the pyroelectric infrared sensor at an amplified level over a DC component.

In the case of the signal processor of the invention according to claim 11, the differential amplifier circuit is constituted by an OP AMP and a series resistor circuit connected between the output end of a low-pass filter circuit and ground, with inverting and noninverting input terminals of OP AMP connected to the output terminal of a pyroelectric infrared sensor and to a voltage dividing point of the series resistor circuit, respectively. Accordingly, in this case, the differential amplifier circuit operates as an inverting amplifier circuit, thereby producing at its output terminal a signal containing at an amplified level only an AC component of an input signal received from the pyroelectric infrared sensor while getting rid of a DC component of the input signal.

In the case of the signal processor of the invention according to claim 12, a buffer circuit is connected between a low-pass filter circuit and a differential amplifier circuit, and, in the case of the signal processor of the invention according to claim 13, a buffer circuit is connected between a pyroelectric infrared sensor and a differential amplifier circuit. Further, in the case of the signal processor of the invention according to claim 15, a buffer circuit is connected between a low-pass filter circuit and a DC biasing means. These buffer circuits serve to suppress noises which might result from electrical interference between signals being processed in the adjacent circuits.

We claim:

1. A signal processor for a pyroelectric infrared sensor, for amplification of a signal from a pyroelectric infrared sensor, said signal processor comprising: a low-pass filter circuit for passing only a DC component of an input signal received from said pyroelectric infrared sensor; and a differential amplifier circuit arranged to amplify and output only an AC component of said input signal from said pyroelectric infrared sensor on the basis of a DC component signal passed through said low-pass filter circuit and said input signal from said pyroelectric infrared sensor.

2. A signal processor for a pyroelectric infrared sensor, for amplification of a signal from a pyroelectric infrared sensor, said signal processor comprising: a low-pass filter circuit for passing only a DC component of an input signal received from said pyroelectric infrared sensor; a differential amplifier circuit arranged to amplify and output only an AC component of said input signal on the basis of a DC signal passed through said low-pass filter circuit and said input signal from said pyroelectric infrared sensor; and a DC biasing circuits connected in a stage succeeding said differential amplifier circuit and adapted to apply a DC bias to an amplified AC signal output from said differential amplifier circuit.

3. A signal processor for a pyroelectric infrared sensor, for amplification of signals from pyroelectric infrared sensors, said signal processor comprising: a plural number of low-pass filter circuits each connected to a respective one of a plural number of pyroelectric infrared sensors for passing only DC components of input signals received from said pyroelectric infrared sensors; and a single differential amplifier circuit arranged to sequentially amplify and output only AC components of input signals received from each of the respective pyroelectric infrared sensors, on the basis of DC signals passed through said low-pass filter circuits and the corresponding input signals from said pyroelectric infrared sensors.

4. A signal processor for a pyroelectric infrared sensor, for amplification of signals from pyroelectric infrared sensors, said signal processor comprising: a plural number of low-pass filter circuits each connected to a respective one of a plural number of pyroelectric infrared sensors for passing only DC components of input signals received from said pyroelectric infrared sensors; a single differential amplifier circuit arranged to sequentially amplify and output AC components of input signals received from each of said pyroelectric infrared sensors, on the basis of DC signals passed through said low-pass filter circuits and the corresponding input signals from said infrared sensors; and a DC biasing circuit connected in a stage immediately succeeding said differential amplifier circuit to add a DC bias to the respective amplified AC signals output from said differential amplifier circuit.

5. A signal processor for a pyroelectric infrared sensor as defined in any one of claims 1 to 4, wherein a switch is provided between said pyroelectric infrared sensor and said differential amplifier circuit, and between said low-pass filter circuit and said differential amplifier circuit.

6. A signal processor for a pyroelectric infrared sensor as defined in claim 2 or claim 4, wherein said DC biasing circuit comprises an inverting amplifier circuit including an OP AMP, and a reference voltage circuit for applying a reference voltage as said bias voltage, said inverting amplifier circuit having an inverting input terminal thereof connected to the output terminal of said differential amplifier circuit and a noninverting input terminal connected to output terminals of both said reference voltage circuit and said low-pass filter circuit.

7. A signal processor for a pyroelectric infrared sensor as defined in claim 6, further comprising a buffer circuit connected between said low-pass filter circuit and said DC biasing circuit.

8. A signal processor for a pyroelectric infrared sensor as defined in any one of claims 1 to 4, wherein said low-pass filter circuit comprises a resistor and a capacitor connected in series between an output terminal of a pyroelectric infrared sensor and ground.

9. A signal processor for a pyroelectric infrared sensor as defined in claim 8, wherein a switching element is connected across the opposite ends of said resistor of said low-pass filter circuit.

10. A signal processor for a pyroelectric infrared sensor as defined in any one of claims 1 to 4, wherein said low-pass filter circuit comprises an OP AMP, a resistor connected between an output terminal and an inverting input terminal of said OP AMP and a capacitor connected in parallel with said resistor, said OP AMP having a noninverting input terminal thereof connected to an output terminal of a respective said infrared sensor.

11. A signal processor for a pyroelectric infrared sensor as defined in any one of claims 1 to 4, wherein said differential amplifier circuit comprises an OP AMP having an inverting input terminal thereof connected to an output terminal of a respective said pyroelectric infrared sensor and having a noninverting input terminal connected to an output terminal of a respective said low-pass filter circuit.

12. A signal processor for a pyroelectric infrared sensor as defined in any of claims 1 to 4, wherein said differential amplifier circuit comprises an OP AMP, and a series resistor circuit connected between an output terminal of said low-pass filter circuit and ground, said OP AMP having a noninverting input terminal thereof connected to a voltage dividing point of said series resistor circuit and having an inverting input terminal connected to an output terminal of a respective said infrared sensor.

13. A signal processor for a pyroelectric infrared sensor as defined in any one of claims 1 to 4, further comprising a buffer circuit connected between said low-pass filter circuit and said differential amplifier circuit.

14. A signal processor for a pyroelectric infrared sensor as defined in any one of claims 1 to 4, further comprising a buffer circuit connected between a respective said pyroelectric infrared sensor and said differential amplifier circuit.

15. A signal processor for pyroelectric infrared sensor as defined in claim 2 or claim 4, further comprising a buffer circuit connected between said low-pass filter circuit and said DC biasing circuit.

* * * * *